US011048094B2

United States Patent
Bae et al.

(10) Patent No.: US 11,048,094 B2
(45) Date of Patent: Jun. 29, 2021

(54) HEAD MOUNTED DISPLAY APPARATUS AND OPERATING METHOD THEREOF

(71) Applicant: SAMSUNG ELECTRONICS CO., LTD., Suwon-si (KR)

(72) Inventors: Yoonjun Bae, Suwon-si (KR); Jaehyun Kim, Suwon-si (KR); Jaehee Kim, Suwon-si (KR); Euihyung Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 51 days.

(21) Appl. No.: 16/265,115

(22) Filed: Feb. 1, 2019

(65) Prior Publication Data

US 2019/0243414 A1 Aug. 8, 2019

(30) Foreign Application Priority Data

Feb. 2, 2018 (KR) .................. 10-2018-0013435

(51) Int. Cl.
*G02B 27/01* (2006.01)
(52) U.S. Cl.
CPC .................. *G02B 27/0176* (2013.01)
(58) Field of Classification Search
CPC ................................. G02B 27/0176
See application file for complete search history.

(56) References Cited

U.S. PATENT DOCUMENTS

| 9,529,194 B2 | 12/2016 | Yoo et al. |
| 2013/0335536 A1 | 12/2013 | Kura et al. |

| 2017/0017085 A1 | 1/2017 | Araki et al. |
| 2017/0139215 A1 | 5/2017 | Tazbaz et al. |
| 2018/0059776 A1 | 3/2018 | Jiang et al. |

FOREIGN PATENT DOCUMENTS

| CN | 204883054 | 12/2015 |
| CN | 106154555 | 11/2016 |
| CN | 205942103 | 2/2017 |
| CN | 206074904 | 4/2017 |
| CN | 206292459 | 6/2017 |

OTHER PUBLICATIONS

Zhuang, et.al., "Wear comfortable VR glasses", CN206292459, machine translation.*
Search Report and Written Opinion dated May 17, 2019 in counterpart International Patent Application No. PCT/KR2019/001444.
Extended European Search Report dated Mar. 5, 2021 in corresponding European Application No. 19748399.3.

* cited by examiner

*Primary Examiner* — Wen Huang
(74) *Attorney, Agent, or Firm* — Nixon & Vanderhye, P.C.

(57) ABSTRACT

Provided are a head mounted display (HMD) apparatus and an operating method thereof. The HMD apparatus including: a band; at least one sensor; and a processor configured to control the HMD apparatus to, based on a user's face approaching an inside surface of the HMD apparatus being sensed by the at least one sensor, rotate the band from a folded state to an unfolded state extending toward the back of the user's head, and to adjust a length of the band in the unfolded state such that the band in the unfolded state comes in contact with the user's head.

20 Claims, 16 Drawing Sheets

HEAD MOUNTED DISPLAY APPARATUS AND OPERATING METHOD THEREOF

CROSS-REFERENCE TO RELATED APPLICATION

This application is based on and claims priority under 35 U.S.C. § 119 to Korean Patent Application No. 10-2018-0013435, filed on Feb. 2, 2018, in the Korean Intellectual Property Office, the disclosure of which is incorporated by reference herein in its entirety.

BACKGROUND

1. Field

The disclosure relates to a head mounted display (HMD) apparatus and an operating method thereof, and, for example, to an HMD apparatus which a user can wear conveniently, and an operating method thereof.

2. Description of Related Art

A head mounted display (HMD) apparatus is worn on a user's head. Users can experience Virtual Reality (VR) and Augmented Reality (AR) through an HMD. HMD apparatuses are used in various fields, such as education, medical treatment, games, sports, art, national defense, science, manufacturing, and distribution.

HMD apparatuses are classified into a soft band type and a hard band type according to wearing methods. The soft band type uses a flexible band to mount an HMD on a user's head. Meanwhile, the hard band type uses an inflexible, fixed band, instead of a flexible band, to mount an HMD on a user's head. Accordingly, the hard band type has the lower degree of freedom in moving the band, compared to the soft band type.

SUMMARY

According to various example embodiments, a head mounted display (HMD) apparatus which a user can easily wear, and an operating method thereof are provided.

Additional aspects will be set forth in part in the description which follows and, in part, will be apparent from the description.

According to an example embodiment of the disclosure, a head mounted display (HMD) apparatus including: a band; at least one sensor; and a processor configured to control the HMD apparatus to, based on a user's face approaching an inside surface of the HMD apparatus being sensed by the at least one sensor, rotate the band from a folded state to an unfolded state extending toward the back of the user's head, and to adjust a length of the band in the unfolded state such that the band in the unfolded state is in contact with the user's head.

According to another example embodiment of the disclosure, a method of operating a HMD apparatus including a band, includes: controlling, based on a user's face approaching an inside surface of the HMD apparatus being sensed by at least one sensor, the band to rotate from a folded state to an unfolded state extending toward the back of the user's head; and adjusting a length of the band in the unfolded state such that the band in the unfolded state is in contact with the user's head.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
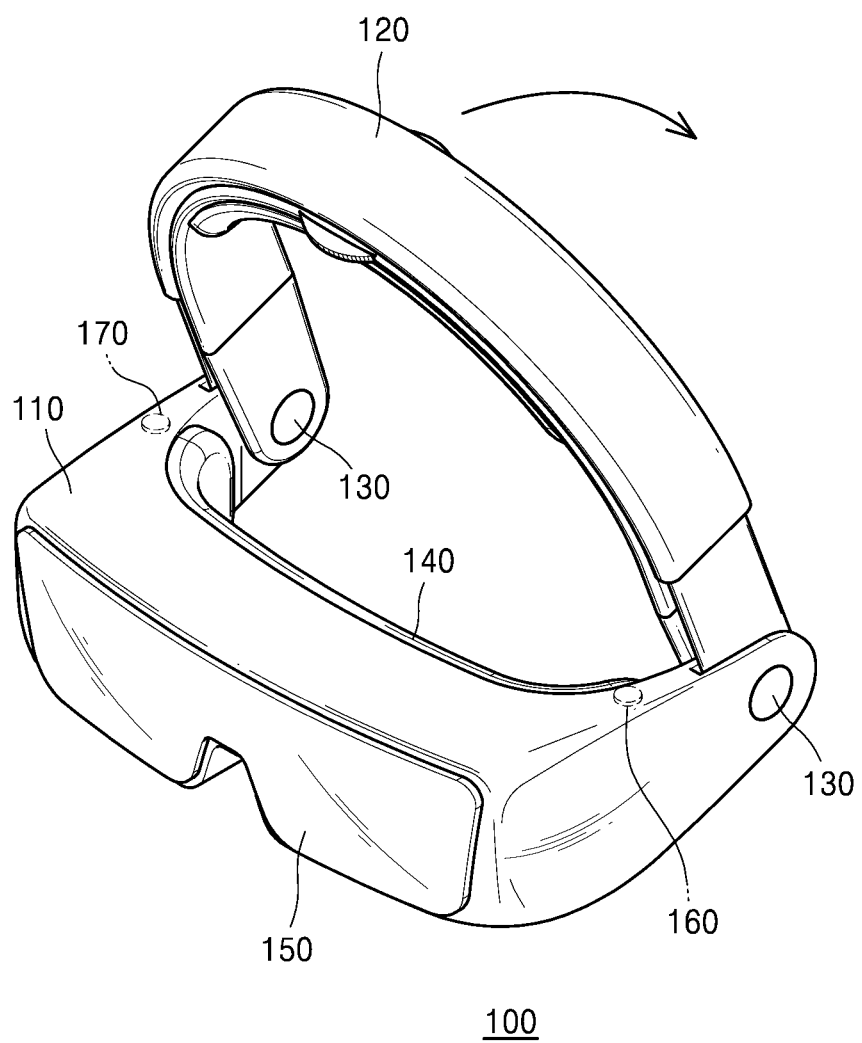
FIG. 1 is a perspective view illustrating an example head mounted display (HMD) apparatus having an easy-wearing structure according to an embodiment, and illustrates an initial state of the HMD apparatus.

Hereinafter, a head mounted display (HMD) apparatus having an easy-wearing structure according to an embodiment of the disclosure will be described in greater detail with reference to the accompanying drawings. In the drawings, the thicknesses of layers or areas may be exaggeratedly illustrated for the clarity of this disclosure.

Descriptions disclosed herein are not intended to limit the HMD apparatus to specific embodiments of the disclosure, and it should be understood that various modifications, equivalents, and/or alternatives of the example embodiments of the disclosure are included in the scope of the disclosure. Also, like numbers refer to like components throughout the description of the drawings.

It will be understood that the terms "comprises", "may comprise,", "includes" and/or "may include", when used herein, specify the presence of stated characteristics (e.g., numerical values, functions, operations, components, such as members, or the like), but do not preclude the presence of additional characteristics.

In this disclosure, the expression "A or B", "at least one of A or/and B", or "one or more of A or/and B" includes all possible combinations of listed items. For example, the expression "A or B", "at least one of A and B", or "at least one of A or B" may include all cases of: (1) including at least one A; (2) including at least one B; or (3) including all of at least one A and at least one B.

Also, it will be understood that, although the terms "first", "second", etc. may be used herein to describe various components regardless of the order and/or degrees of importance, the corresponding components should not be limited by these terms. These terms are simply used to distinguish one component from another. For example, a first user device and a second user device may indicate different user devices, regardless of the order or degrees of importance. For example, a first component could be termed a second component, and similarly, a second component could be termed a first component, without departing from the scope of the disclosure.

It will be understood that when a component (e.g., a first component) is referred to as being "(operatively or communicatively) coupled with/to" or "connected to" to another component (e.g., a second component), it can be directly connected or coupled to the other component or to the other component through another intervening component (e.g., a third component).

As used herein, the expression "configured to" may be used interchangeably with, for example, "suitable for", "having the capacity to", "designed to", "adapted to", "made to", or "capable of", in some situations. The expression "configured to" may not necessarily refer to hardware "specifically designed to". Instead, in some situations, the expression "apparatus configured to" may refer, for example, to a situation in which the apparatus "can do something" together with another apparatus or component. For example, the expression "processor configured to perform A, B, and C" may refer, for example, and without limitation, to a dedicated processor (e.g., embedded processor) for performing the corresponding operations, a generic-purpose processor (e.g., central processing unit (CPU)), an application processor (AP) for executing one or more software programs stored in a memory device to perform the corresponding operations, or the like.

Also, the terminology used herein is for the purpose of describing particular embodiments of the disclosure, and is not intended to be limiting of the disclosure. As used herein, the singular forms "a", "an" and "the" are intended to include the plural forms as well, unless the context clearly indicates otherwise. In this disclosure, it will be understood that the case in which a certain part is "connected" to another part includes the case in which the part is "electrically connected" to the other part, as well as the case in which the part is "physically connected" to the other part. Also, it will be understood that when a certain part "includes" a certain component, the part does not exclude another component but can further include another component, unless the context clearly dictates otherwise.

As used herein, the term "the" and the similar term used in the present disclosure, for example, in claims are intended to include the plural forms as well as the singular forms. Also, operations of a method according to the disclosure can be executed in any order unless a specific order is definitely specified in the context. The disclosure is not limited to the order in which the operations are written.

In this disclosure, the phrase "in some embodiments" or "in an embodiment" may not necessarily indicate the same embodiment of the disclosure.

Some embodiments of the disclosure may be represented by functional block configurations and various processing operations. The entire or a part of the functional blocks may be implemented with various numbers of hardware and/or software and/or any combination thereof to execute specific functions. For example, the functional blocks of the disclosure may be implemented by one or more microprocessors or circuit configurations for predetermined functions. Also, for example, the functional blocks of the disclosure may be implemented with various programming or scripting languages. The functional blocks may be implemented as an algorithm that is executed on one or more processors. The disclosure may adopt typical techniques for electronic environment settings, signal processing, and/or data processing, etc. The terms "mechanism", "factor", "means", "configuration", and the like may be used in a broad sense, without being limited to mechanical and physical configurations.

Also, connection lines or connection members between components shown in the drawings may be examples of functional connections and/or physical or circuit connections. In an actual apparatus, connections of components may be represented by alternative or additional various functional connections, physical connections, or circuital connections.

Hereinafter, an HMD apparatus according to various example embodiments of the disclosure will be described with reference to the accompanying drawings. In the following description, the term "user" may refer, for example, to a person using the HMD apparatus or equipment in which the HMD apparatus is used.

FIG. 1 is a perspective view illustrating an example HMD apparatus having an easy-wearing structure according to an embodiment of the disclosure. In FIG. 1, the HMD apparatus may be in an initial state, for example, an off state in which it does not operate.

Referring to FIG. 1, an HMD apparatus 100 having an easy-wearing structure according to an embodiment of the disclosure may include a body 110 and a band 120 connected to the body 110. When the HMD apparatus 100 is not worn on a user, or when the HMD apparatus 100 is in an off state, the band 120 may stand as illustrated in FIG. 1. The band 120 may be mechanically connected to the body 110 through a connection portion 130. A mechanical operation of the connection portion 130 may be controlled by an electrical method using, for example, and without limitation, a motor, or the like.

The connection portion 130 may include a button for operating the band 120. The band 120 may be connected to the body 110 to be movable with respect to the body 110. For example, the band 120 may be connected to the body 110 in such a way to be rotatable with respect to the body 110 through the connection portion 130 when the HMD apparatus 100 is put on a user's head.

Figure 14:
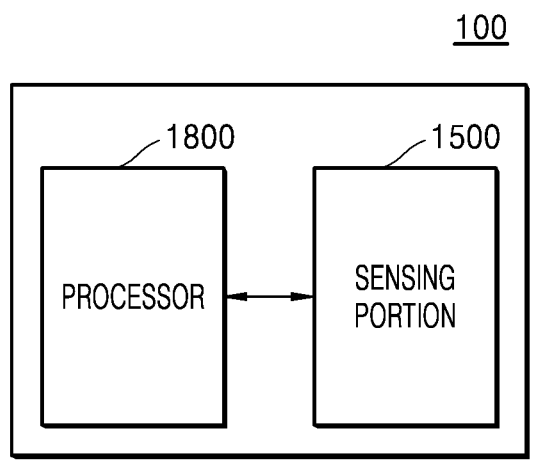
FIGS. 14 and 15 are block diagrams illustrating an example HMD apparatus according to an embodiment.
Figure 15:
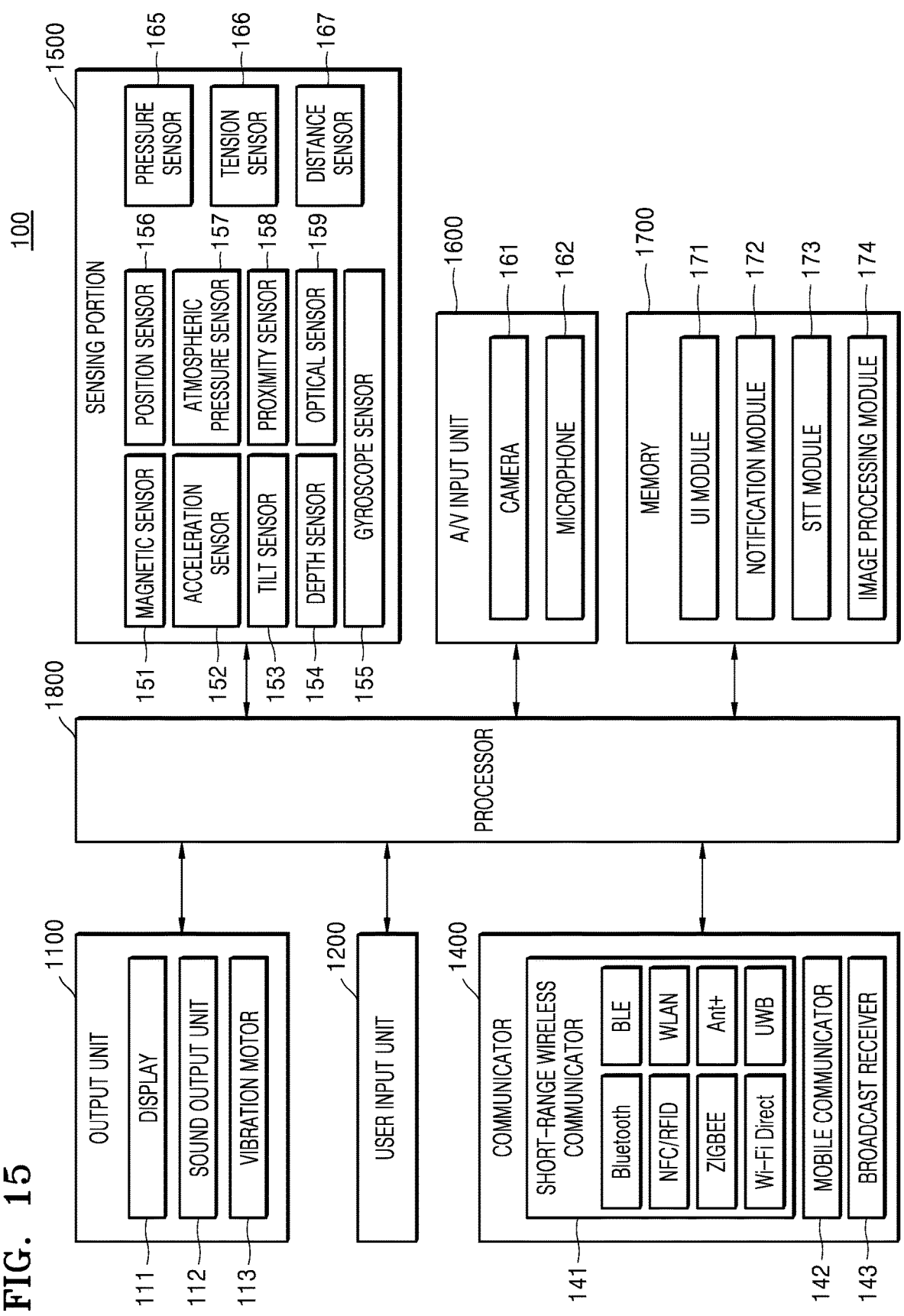

According to an embodiment of the disclosure, the band 120 may operate under the control of a processor 1800 (see FIGS. 14 and 15). For example, the band 120 may rotate under the control of the processor 1800. The band 120 may be lengthened or shortened under the control of the processor 1800.

The body 110 may include a window 150 in the front portion. The edges of the window 150 may be surrounded by the body 110.

According to an embodiment of the disclosure, the window 150 may, for example, and without limitation, be made of a transparent material to allow a user to see a real space through the window 150. For example, the window 150 may be made of, for example, and without limitation, plastic such as polycarbonate, a glass material, or the like, although the disclosure is not limited thereto. According to an embodiment of the disclosure, the window 150 may include, for example, and without limitation, at least one of an anti-reflective or anti-glare coating, an anti-fogging coating, a UV-blocking coating, or the like.

According to an embodiment of the disclosure, the window 150 may be controlled to be transparent or opaque for the purpose of use of the HMD apparatus 100. For example, when the HMD apparatus 100 is used as an apparatus for providing Virtual Reality (VR), the window 150 may be opaque. When the HMD apparatus 100 is used as an apparatus for providing Augmented Reality (AR), the window 150 may be transparent, although the disclosure is not limited thereto.

According to an embodiment of the disclosure, the processor 1800 of the HMD apparatus 100 may control a degree of transparency of the window 150 based, for example, and without limitation, on the attributes of an application being executed or content that is to be displayed. According to an embodiment of the disclosure, the processor 1800 may, for example, determine whether content that is to be displayed is AR or VR, based on metadata or additional information of an application or the content.

When the HMD apparatus 100 is a hybrid apparatus capable of providing both VR and AR, the window 150 may be a display window that can electrically control a degree of transparency based on an operation provided by the HMD apparatus 100.

Figure 7:
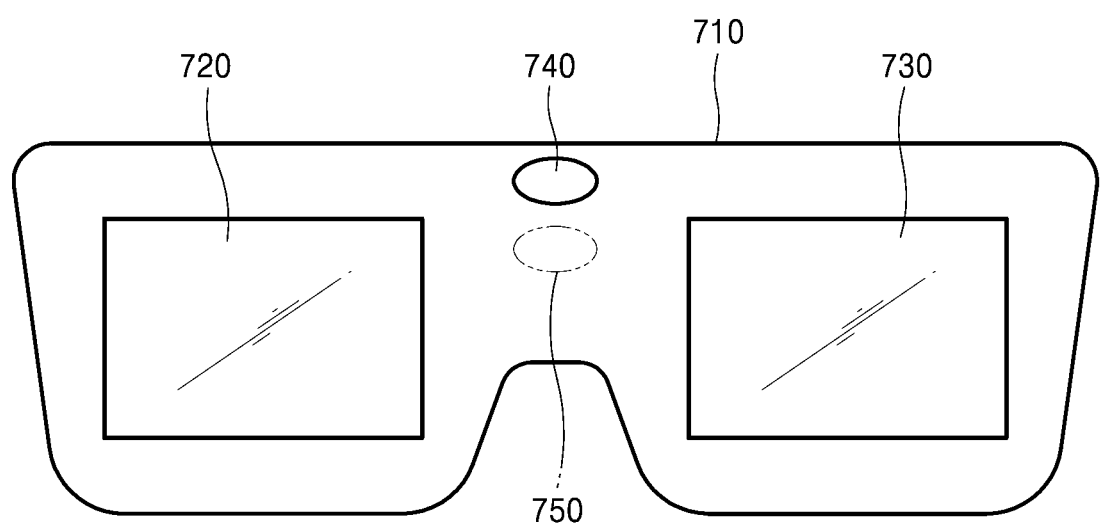
FIG. 7 is a diagram illustrating an inside surface of an example HMD apparatus which faces a user's eyes when the HMD apparatus is worn by the user according to an embodiment.

According to an embodiment of the disclosure, the HMD apparatus 100 may be configured to control the window 150 to function as a plurality of displays (see FIG. 7). For example, a plurality of displays (720 and 730 of FIG. 7) may be substituted for the entire or a part of the window 150.

According to an embodiment of the disclosure, the displays may, for example, and without limitation, be transparent displays or translucent displays. When the displays are translucent displays, the displays may be implemented, for example, and without limitation, with at least one optical waveguide (for example, a prism), an electroluminescent display (ED), a Liquid Crystal Display (LCD), or the like, although the disclosure is not limited thereto.

According to another embodiment of the disclosure, the body 110 may include a button or a touch sensor for operating the band 120 at another area of the body 110, instead of the button included in the connection portion 130. For example, the body 110 may include right and left button areas 160 and 170 at the left and right parts of the upper surface when seen at a position facing toward the window 150. When touch sensors are included in the right and left button areas 160 and 170, the right and left button areas 160 and 170 may be touch areas. The HMD apparatus 100 may include at least one of the right and left button areas 160 and 170. For example, right handers may need the left button area 170, and left handers may need the right button area 160.

In FIG. 1, a reference numeral 140 may, for example, denote a pad that is in contact with the skin around the user's eyes when the user wears the HMD apparatus 100. The pad 140 may have a cushion. An arrow shown in FIG. 1 represents a direction in which the band 120 moves when it operates.

Figure 2:
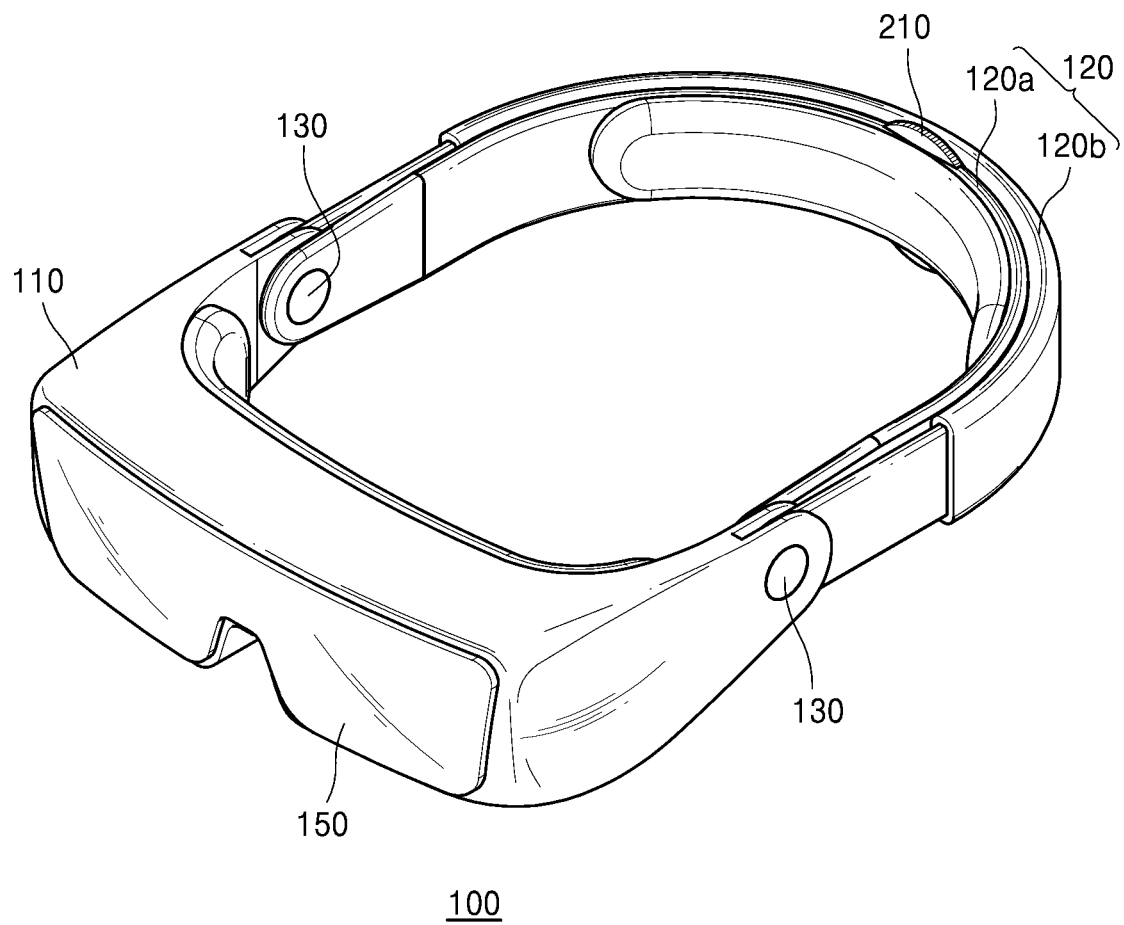
FIG. 2 is a perspective view illustrating the example HMD apparatus of FIG. 1 when the HMD apparatus is worn by a user with a band moved to the back of the user's head according to an embodiment.

FIG. 2 is a perspective view illustrating the example HMD apparatus 100 of FIG. 1 when the HMD apparatus 100 is worn by a user with the band 120 moved to the back of the user's head.

When the user presses the button included in the connection portion 130 in the state of FIG. 1 while holding the HMD apparatus 100 in order to put the HMD apparatus 100 on his/her head, the band 120 may rotate in a direction that is opposite to the window 150 to extend as illustrated in FIG. 2. When the user again presses the button included in the connection portion 130, the band 120 may return to its original position.

According to an embodiment of the disclosure, the band 120 may rotate automatically in the direction that is opposite to the window 150, under the control of the processor 1800, based on a sensing value sensed by a sensing portion 1500 (see FIGS. 14 and 15), to extend.

Figure 4:
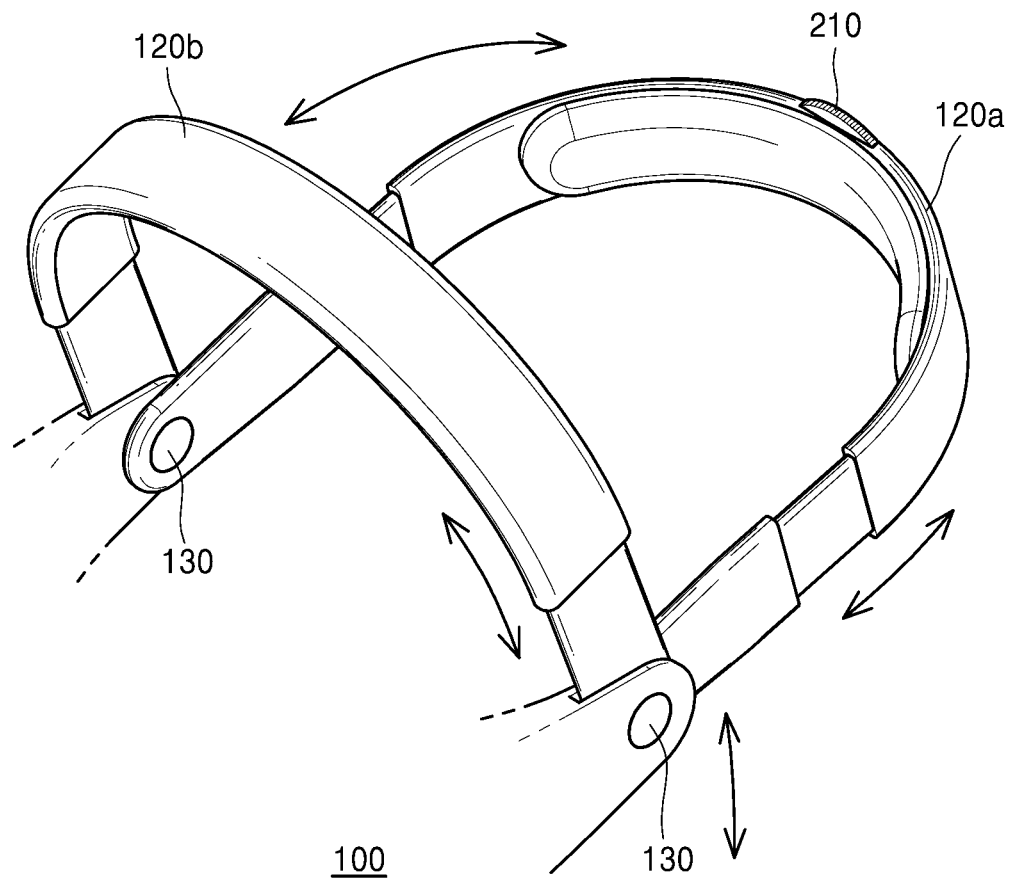
FIG. 4 is a perspective view illustrating the example HMD apparatus of FIG. 2 when a sub band moves to the top of a user's head according to an embodiment.

Referring to FIG. 2, the band 120 may include a main band 120a located in the inside and a sub band 120b located in the outside. The band 120 may have a structure in which the sub band 120b overlaps the main band 120a at the outer surface. The main band 120a may be in contact with the back of the user's head. The sub band 120b may be independently rotatable. The sub band 120b may operate manually. The sub band 120b may enable the user to wear the HMD apparatus 100 more stably (e.g., securely). The sub band 120b may be raised to the top of the user's head, as illustrated in FIG. 4, and the length of the sub band 120 may be adjusted. The main band 120a may include an adjusting wheel 210 at a location corresponding to the back of the user's head. The adjusting wheel 210 may be used to adjust tension of the main band 120a. Accordingly, the user may adjust tension of the main band 120a using the adjusting wheel 210 to apply appropriate pressure to his/her head.

According to another example, the sub band 120b may be included in the inside of the main band 120a. That is, the band 120 may have a structure in which the sub band 120b overlaps the main band 120a in the inside of the main band 120a. In this example, the sub band 120b may be in contact with the back of the user's head.

When the HMD apparatus 100 is in an off state, for example, when the HMD apparatus 100 is in a state as illustrated in FIG. 1, the main band 120a may be released sufficiently to have some degree of great tension. In this state, the adjusting wheel 210 may be locked so that the main band 120a may maintain the tension. Accordingly, when the user wearing the HMD apparatus 100 moves the band 120 to the back of his/her head, the band 120 may barely contact the user's hair.

After the band 120 moves to the back of the user's head as shown in FIG. 2, the user may release the lock state of the adjusting wheel 210 to adjust tension of the main band 120a, which will be described in greater detail below, and after the tension of the main band 120a is appropriately adjusted, the user may again convert the adjusting wheel 210 to a lock state to maintain the tension of the main band 120a. When the user takes off the HMD apparatus 100, the user may perform the above-described process in the reverse order to release the main band 120a sufficiently (to raise tension of the main band 120a), and press the button included in the connection portion 120 to thereby finish the taking-off process.

Figure 3:
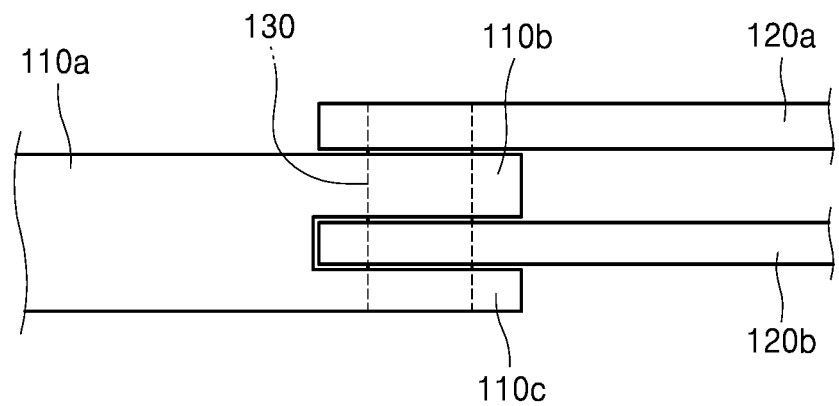
FIG. 3 is a top view illustrating a connection portion of an example band and a body in the HMD apparatus illustrated in FIG. 2 according to an embodiment.

FIG. 3 is a top view illustrating the connection portion 130 of the band 120 and the body 110 in the example HMD apparatus 100 illustrated in FIG. 2.

Referring to FIG. 3, one end of the main band 120a and the sub band 120b may be coupled with one end 110a of the body 110 through the connection portion 130. The main band 120a and the sub band 120b may be coupled with the connection portion 130 in such a way to be rotatable on the connection portion 130 as a rotation axis. The end 110a of the body 110 may include a first protrusion 110b and a second protrusion 110c at the tip. The sub band 120a may be positioned between the first protrusion 110b and the second protrusion 110c. The main band 120a may face an inner side surface of the first protrusion 110b. The coupling structure between the end 110a of the body 110 and the main and sub bands 120a and 120b, as shown in FIG. 3, may be an example for description, and it will be understood by one of ordinary skill in the art that various modifications are possible. Accordingly, the example of FIG. 3 should be not interpreted to be limiting coupling between the end 110a of the body 110 and the main and sub bands 120a and 120b.

FIG. 4 is a perspective view illustrating that the main band 120a and the sub band 120b can rotate and the lengths of the main band 120a and the sub band 120b can be adjusted according to an embodiment.

Figure 5:
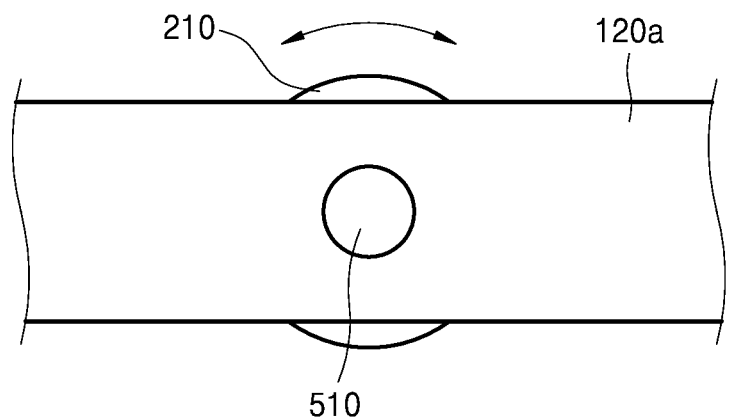
FIG. 5 is a rear view illustrating a portion in which an example adjusting wheel of a main band is located, in the HMD apparatus of FIG. 4 according to an embodiment.

FIG. 5 is a rear view illustrating a portion in which the adjusting wheel 210 of the main band 120a is located, in the example HMD apparatus 100 of FIG. 4 according to an embodiment. In FIG. 5, for convenience of illustration, the sub band 120b is not shown.

Referring to FIG. 5, a button 510 may be provided in a portion of the main band 120a corresponding, for example, to the center of the adjusting wheel 210. The button 510 may operate in, for example, a toggle type, and may include a lock button or a unlock button, but the disclosure is not limited thereto. In the HMD apparatus 100, although the button 210 may be covered with the sub band 120b, the user may easily recognize the button 510 through the sub band 120b because the sub band 120b is made of a soft, flexible material. A diameter of the adjusting wheel 210 may, for example, be greater than a width of the main band 120a, the width of the main band 120a being perpendicular to the length of the main band 120a. Accordingly, a part of the adjusting wheel 210 may protrude out of the main band 120a, as seen from the rear view.

Figure 6:
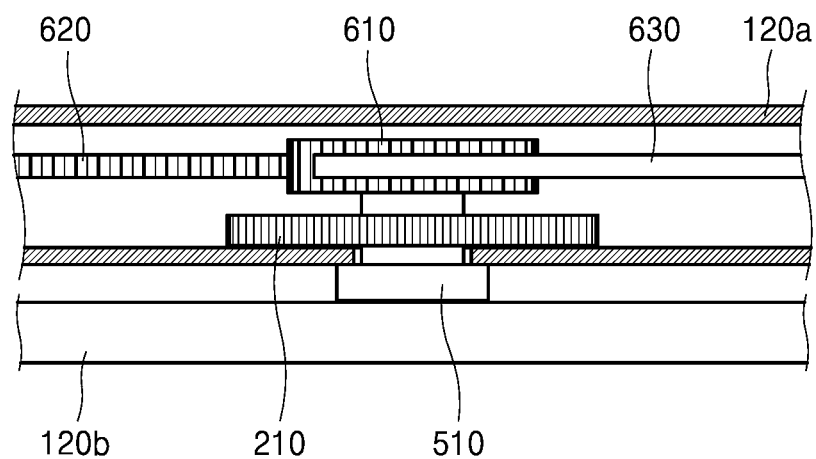
FIG. 6 is a diagram illustrating an example lock state in which the main band is engaged with the adjusting wheel, in the HMD apparatus of FIG. 2 according to an embodiment.

FIG. 6 is a diagram illustrating an example lock state in which the main band 120a is engaged with the adjusting wheel 210, in the example HMD apparatus 100 of FIG. 2 according to an embodiment.

Referring to FIG. 6, the button 510 may be covered with the sub band 120b. A gear 610 may be disposed in the main band 120a, and the gear 610 may be coupled with the button 510 through the adjusting wheel 210. The gear 610 may be engaged with lower and upper bands 620 and 630 having tension in the main band 120a. The lower band 620 may be engaged with the lower portion of the gear 610, and the upper band 630 may be engaged with the upper portion of the gear 610. The bands 620 and 630 having tension may, for example, have teeth that are engaged with teeth formed on the surface of the gear 610, on the surfaces engaged with the gear 610. The surfaces of the bands 620 and 630 having tension, engaged with the gear 610, may, for example, be straight gears. Accordingly, when the user turns the adjusting wheel 210 in one direction in the state of FIG. 6, the main band 120a may be tightened, and when the user turns the adjusting wheel 210 in the opposite direction, the main band 120a may be released.

FIG. 7 is a diagram illustrating an inside area 710 of the example HMD apparatus 100 according to an embodiment of the disclosure, wherein the inside area 710 faces a user's eyes when the HMD apparatus 100 is worn by the user.

Referring to FIG. 7, the inside area 710 of the HMD apparatus 100 may, for example, be an area corresponding to the window 150 (see FIG. 1) of the HMD apparatus 100. The inside area 710 may, for example, include a first display 720 and a second display 730 respectively corresponding to the user's left and right eyes, although the disclosure is not limited thereto.

According to an embodiment of the disclosure, the first display 720 and the second display 730 may be integrated into one display area. For example, the inside area 710 of the HMD apparatus 100 may, for example, and without limitation, be implemented as one display.

The first and second displays 720 and 730 may include a translucent optical waveguide (for example, a prism). The translucent optical waveguide (for example, a prism) may reflect light output from a projector to focus an image on the fovea of the eye's retina of a user wearing the HMD apparatus 100.

The first and second displays 720 and 730 of FIG. 7 may be a non-limiting example embodiment of a display 111 of FIG. 15.

According to an embodiment of the disclosure, a first sensor 740 may be provided between the first display 720 and the second display 730. The first sensor 740 may, for example, be a sensor for turning on the HMD apparatus 100 by sensing whether a user wears the HMD apparatus 100. The first sensor 740 may have a function of sensing a distance to a user. The first sensor 740 may sense a distance between the HMD apparatus 100 and a user in order to automatically operate the band 120. The button included in the connection portion 130 may be used to move the band 120 to its original position when the user takes off the HMD apparatus 100.

Meanwhile, according to another embodiment of the disclosure, in the inside area 710 of the HMD apparatus 100, a second sensor 750 may, for example, be further provided in addition to the first sensor 740. In this case, the first sensor 740 may function to turn on the power when the user wears the HMD apparatus 100, and the second sensor 750 may sense a distance to a user to operate the band 120.

The first sensor 740 and the second sensor 750 illustrated in FIG. 7 are non-limiting examples. Also, the positions of the first sensor 740 and the second sensor 750 illustrated in FIG. 7 are an example embodiment of the disclosure, and the first sensor 740 and the second sensor 750 may be located at different positions. According to an embodiment of the disclosure, an integrated sensor may function as both the first sensor 740 and the second sensor 750.

According to an embodiment of the disclosure, the first sensor 740 and the second sensor 750 illustrated in FIG. 7 may be at least one sensor included in the sensing portion 1500 illustrated in FIGS. 14 and 15. Also, the first sensor 740 and the second sensor 750 may be a combination of at least one sensor included in the sensing portion 1500 of FIGS. 14 and 15.

FIGS. 1 to 7 are provided to illustrate an example embodiment of the disclosure, and the disclosure is not limited to the example embodiment illustrated in FIGS. 1 to 7.

Figure 8:
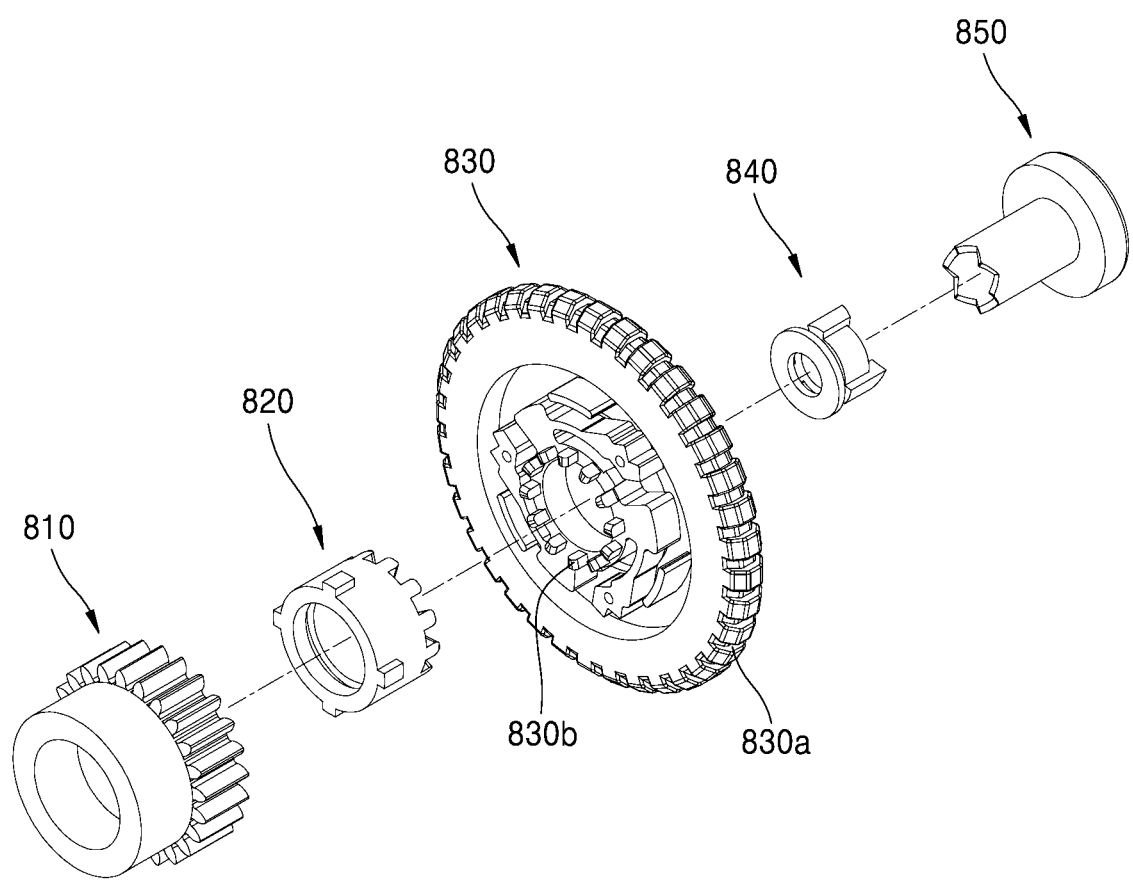
FIG. 8 is an exploded perspective view illustrating example members for locking and unlocking a main band of an example HMD apparatus according to an embodiment.

FIG. 8 is an exploded perspective view of an example module for locking and unlocking the main band 120a of the example HMD apparatus 100 according to an embodiment of the disclosure, for example, a module including the adjusting wheel 210 included in the main band 120a of FIG. 6, the gear 610 connected to the adjusting wheel 210, and the related members.

In FIG. 8, a reference numeral 810 may denote, for example, a gear mechanically connected to the bands 620 and 630 having tension of the main band 120a, a reference numeral 820 may denote, for example, a shifting fork, a reference numeral 830 may denote, for example, an adjusting wheel, a reference numeral 830a may denote, for example, an edge of the adjusting wheel, and a reference numeral 830b may denote, for example, a wheel lock. Reference numeral 840 may denote, for example, a shifting piece, and a reference numeral 850 may denote, for example, a button. The shifting fork 820 may be inserted in the gear 810, and a portion of the shifting fork 820 facing the wheel lock 830b may be engaged with the wheel lock 840b when the HMD apparatus 100 is locked. The shifting piece 840 may be inserted in the shifting fork 820. The button 850 may be in contact with the shifting piece 840.

Figure 9:
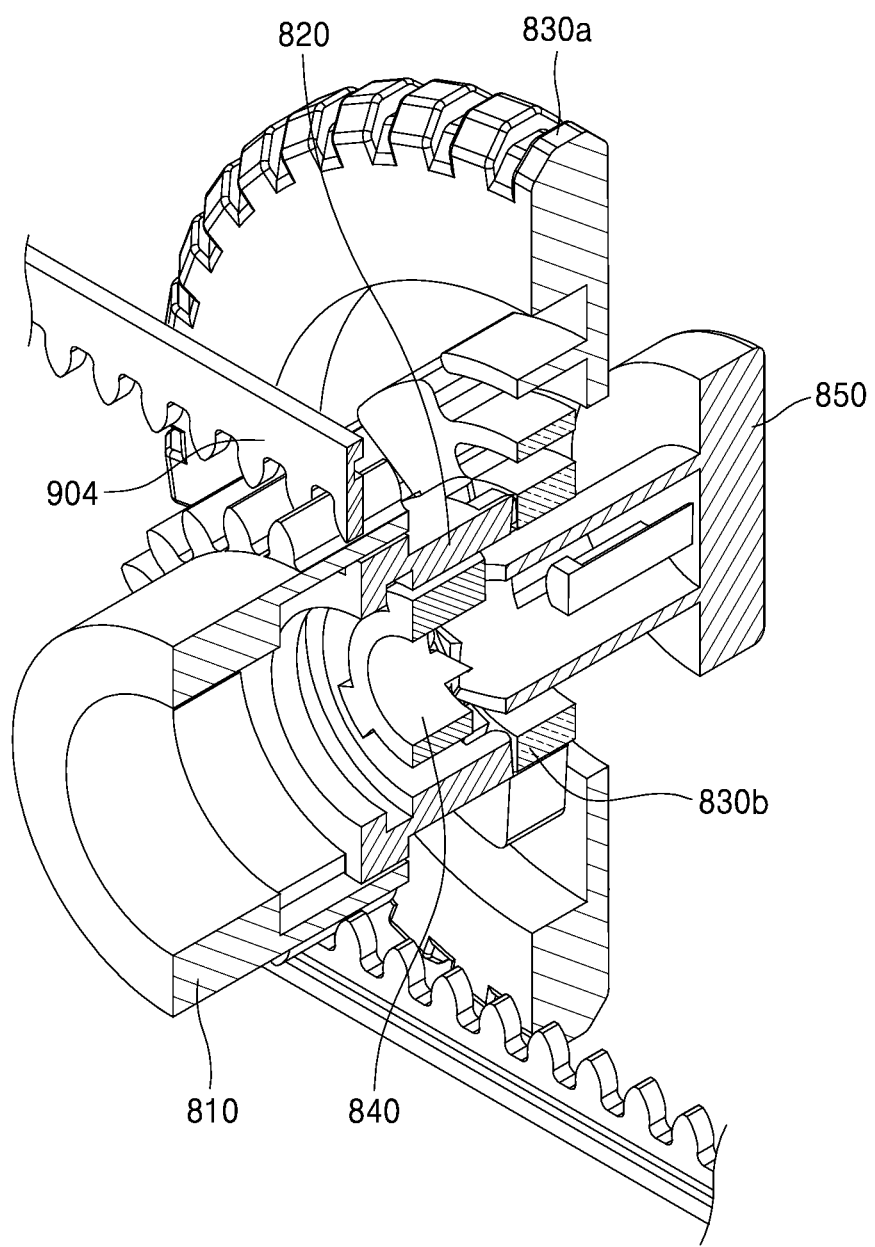
FIG. 9 is a perspective view illustrating the example members illustrated in FIG. 8 when the members are in a lock state according to an embodiment.
Figure 10:
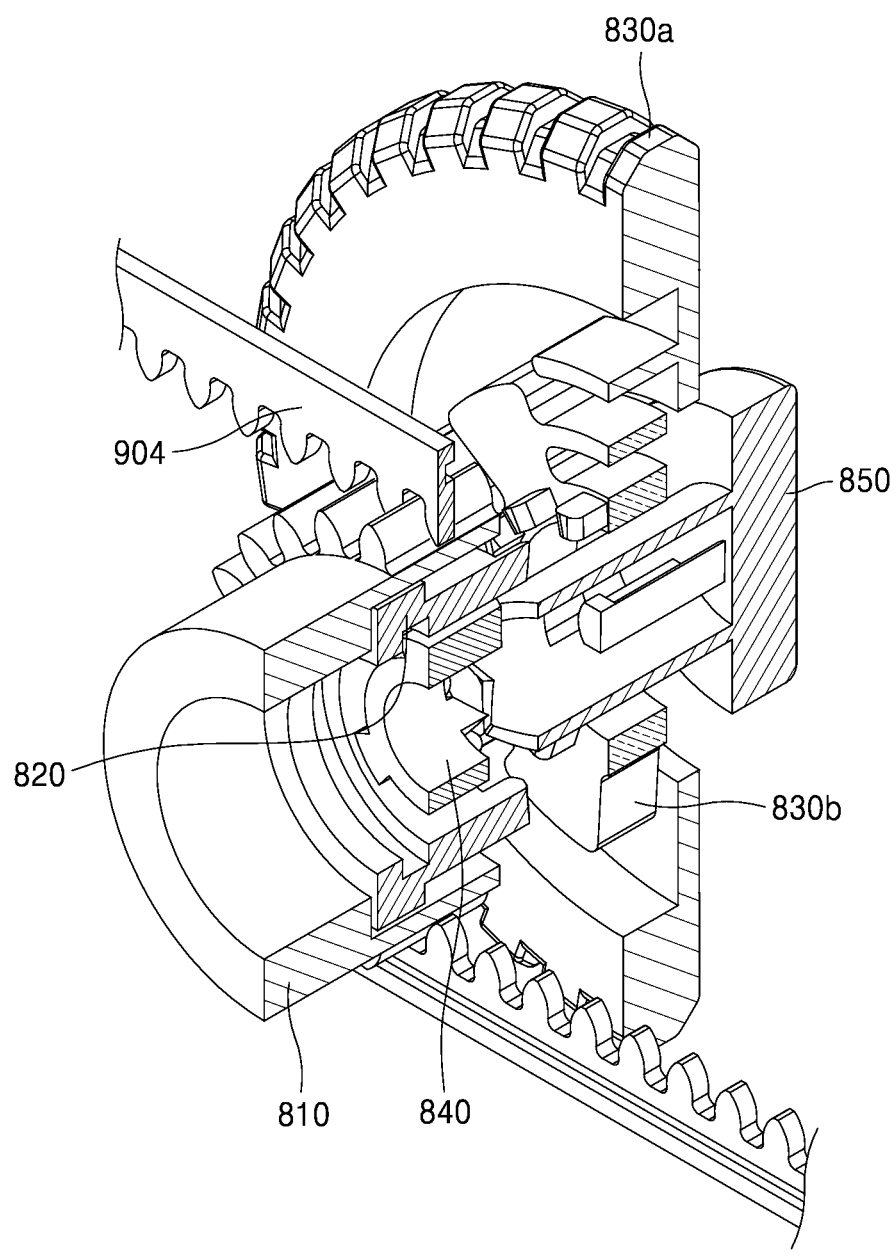
FIG. 10 is a perspective view illustrating the example members illustrated in FIG. 8 when the members are in a unlock state according to an embodiment.

FIG. 9 is a diagram illustrating the example module for locking and unlocking the main band 120a of the example HMD apparatus 100 when the module is in a lock state, according to an embodiment, and FIG. 10 is a diagram illustrating the example module which is in a unlock state according to an embodiment.

Referring to FIG. 9, the shifting fork 820 may be engaged with the wheel lock 830b. Accordingly, when the adjusting wheel 830a is turned in this state, a rotational force may be transferred to the gear 810 to thus adjust tension of the band 904 in the main band 120a.

In FIG. 10, the shifting fork 820 may be not in contact with the wheel lock 830b. The state illustrated in FIG. 10 may, for example, be a state when a user presses the button 850 to unlock the main band 120 from the lock state of FIG. 9. Accordingly, the gear 810 may freely rotate by the tension of the band 904. In this example, the main band 120a may be tightened to appropriately press (e.g., be secured to) a user's head. When the user wants to increase the pressure of the main band 120a, the user may press the button 150 to set a lock state as shown in FIG. 9, and then turn the adjusting wheel 830a to further tighten the main band 120a.

Figure 11:
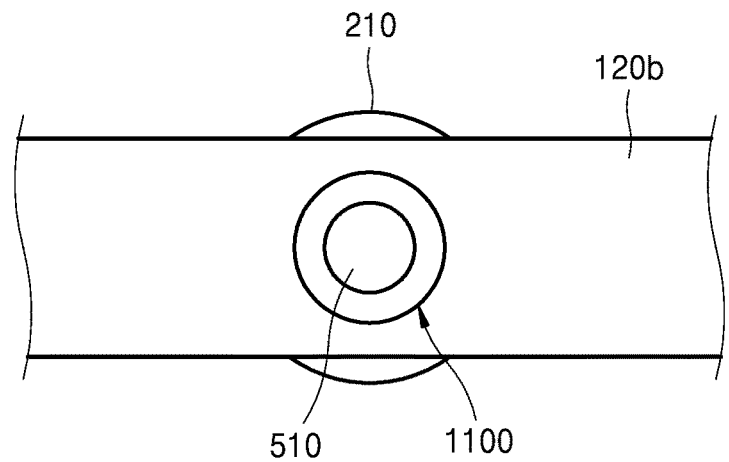
FIG. 11 is a rear view illustrating an example portion of the sub band corresponding to the adjusting wheel of the main band in the HMD apparatus of FIG. 2, wherein a through hole is formed in the portion of the sub band according to an embodiment.

FIG. 11 is a diagram illustrating another embodiment of the sub band 120b of the example HMD apparatus 100 according to an embodiment.

Referring to FIG. 11, a through hole 1100 may be formed in a portion of the sub band 120b corresponding to the adjusting wheel 210. The through hole 1100 may expose the button 510. Because the button 510 is exposed through the through hole 1100, a user may contact the button 510 when the HMD apparatus 100 is in a state illustrated in FIG. 2, and accordingly, the user may more easily operate the button 510.

Figure 12:
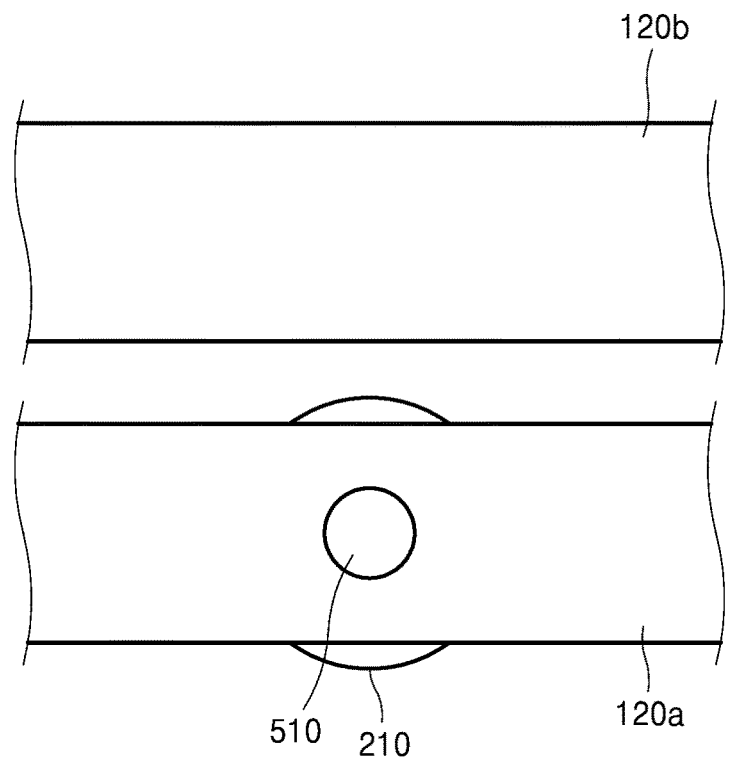
FIG. 12 is a rear view illustrating an example main band and a sub band that are arranged in parallel above and below each other in an example HMD apparatus according to another embodiment.

FIG. 12 is a diagram illustrating another embodiment of an example configuration of the band 120 of the example HMD apparatus 100 according to an embodiment.

Referring to FIG. 12, the sub band 120b may not overlap the main band 120a. The sub band 120b may, for example, be positioned immediately above the main band 120a. An interval between the main band 120a and the sub band 120b may be small enough for a user to hold the two bands 120a and 120b with one hand.

Figure 13:
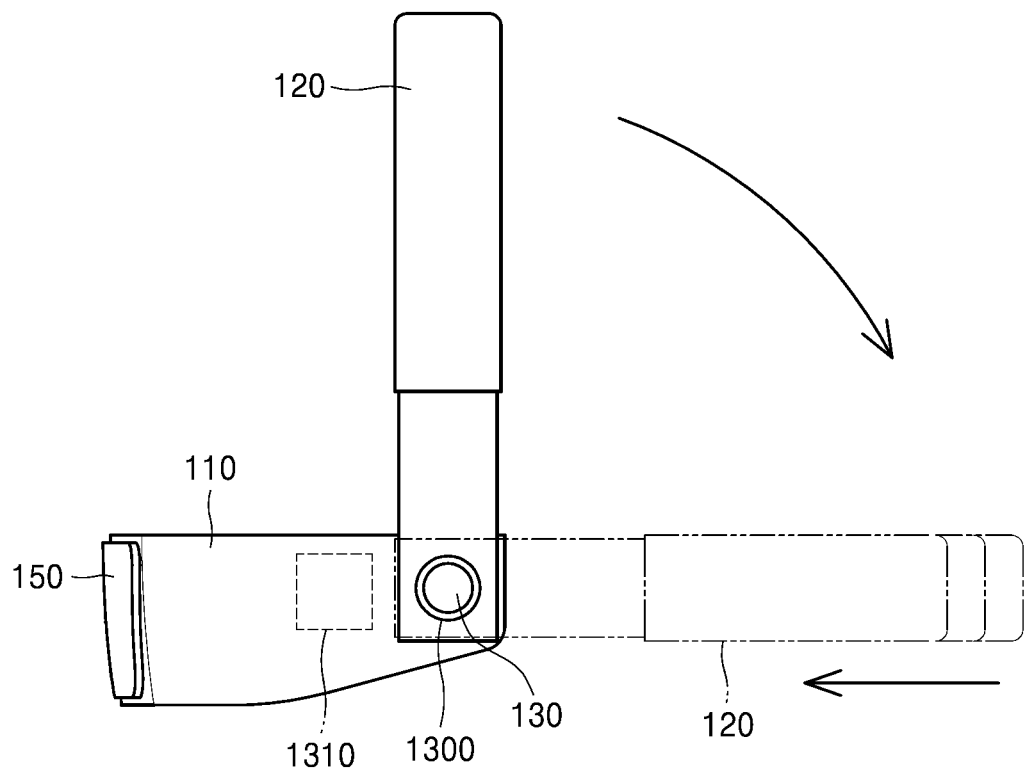
FIG. 13 is a side view illustrating an example HMD apparatus when a band of the HMD apparatus moves according to another embodiment.

FIG. 13 is a diagram illustrating an example HMD apparatus according to another embodiment.

Referring to FIG. 13, the body 110 may include a third sensor 1300 disposed, for example, and without limitation, at or around the connection portion 130, and a controller (e.g., including processing circuitry) 1310 for receiving a signal from the third sensor 1300 and providing control and operation signals. The HMD apparatus 100 may include, for example, a drive motor for adjusting the length of the band 120. The third sensor 1300 may sense a rotation of the band 120 through the connection portion 130 to determine whether the band 120 extends as illustrated in FIG. 2. When the band 120 extends, the third sensor 1300 may sense the extension of the band 120 and transfer a signal to the controller 1310. The controller 1310 may drive the motor based on the signal received from the third sensor 1300 to adjust the length of the extended band 120.

The third sensor 1300 shown in FIG. 13 may illustrate an example of a sensor, and the third sensor 1300 is not limited to the example shown in FIG. 13. Also, a position of the third sensor 1300 shown in FIG. 13 is an example, and the third sensor 1300 may be disposed at any other position.

For example, the third sensor 1300 may be at least one sensor included in the sensing portion 1500 of FIGS. 14 and 15. The third sensor 1300 may be a combination of at least one sensor included in the sensing portion 1500 of FIGS. 14 and 15.

The position of the controller 1310 shown in FIG. 13 is an example, and the controller 1310 may be disposed at any other position. The controller 1310 may be an example of the processor 1800 of FIGS. 14 and 15 which will be described in greater detail below.

According to an embodiment of the disclosure, the HMD apparatus 100 may be automatically worn on a user's head without using a separate operating button, under the control of the controller 1310. For example, when the user brings the HMD apparatus 100 close to the user's face in order to wear the HMD apparatus 100, the at least one sensing portion 1500 (see FIGS. 14 and 15) included in the HMD apparatus 100 may sense a distance to the user, and operate the band 120 such that the band 120 surrounds the user's head with appropriate pressure.

FIGS. 8 to 13 illustrate an example embodiment of the disclosure, and the disclosure is not limited to the example embodiment illustrated in FIGS. 8 to 13.

FIGS. 14 and 15 are block diagrams illustrating an example HMD apparatus according to an embodiment. As shown in FIG. 14, the HMD apparatus 100 may include the processor (e.g., including processing circuitry) 1800 and the sensing portion (e.g., including at least one sensor and/or sensing circuitry) 1500. However, all components shown in FIGS. 14 and 15 may be not essential components, and the HMD apparatus 100 may be implemented with more or less components than those shown in FIGS. 14 and 15.

For example, as shown in FIG. 15, the HMD apparatus 100 according to an embodiment of the disclosure may further include an output unit (e.g., including output circuitry) 1101, a user input unit (e.g., including input circuitry) 1200, a communicator (e.g., including communication circuitry) 1400, an Audio/Video (A/V) input unit (e.g., including A/V input circuitry) 1600, and memory 1700, in addition to the processor 1800 and the sensing portion 1500. The sensing portion 1500 may also be referred to as a sensor portion.

Hereinafter, the above-mentioned components will be described in greater detail.

Generally, the processor 1800 may include various processing circuitry and control overall operations of the HMD apparatus 100. For example, the processor 1800 may execute programs stored in the memory 1700 to control overall operations of the output unit 1101, the user input unit 1200, the communicator 1400, the sensing portion 1500, the NV input unit 1600, etc.

The processor 1800 may be connected to the HMD apparatus 100 in a wired or wireless fashion to control the individual components of the HMD apparatus 100. For example, the processor 1800 may receive data from a camera 161 and/or the user input unit 1200, analyze the received data, and output data through at least one of the display 111 and/or a sound output unit 112.

According to an embodiment of the disclosure, the processor 1800 may use at least one sensor of the sensing portion 1500 to sense a user's face approaching the inside surface of the HMD apparatus 100, thereby controlling the folded band 120 to extend toward the back of the user's head.

According to an embodiment of the disclosure, the processor 1800 may adjust the length of the band 120 such that the extended band 120 is in close (e.g., secure) contact with the user's head, using the at least one sensing portion 1500.

According to an embodiment of the disclosure, the processor 1800 may adjust the length of the band 120, based, for example, and without limitation, on at least one of pressure between the band 120 and the user's head, a distance between the band 120 and the user's head, tension of the band 120, or the Ike, sensed by the at least one sensing portion 1500.

According to an embodiment of the disclosure, the processor 1800 may adjust the length of the band 120 based on a pre-set sensing value corresponding to user identification information.

According to an embodiment of the disclosure, the processor 1800 may adjust the length of the band 120 based on a user input.

According to an embodiment of the disclosure, the processor 1800 may rotate the sub band 120*b* toward the top of the user's head, based on a predetermined condition.

According to an embodiment of the disclosure, when a movement exceeding a predetermined threshold value is sensed in the HMD apparatus 100 by the at least one sensing portion 1500, the processor 1800 may rotate the sub band 120*b* to the top of the user's head.

According to an embodiment of the disclosure, the processor 1800 may rotate the sub band 120*b* to the top of the user's head, based on a user input.

According to an embodiment of the disclosure, the processor 1800 may adjust the length of the sub band 120*b* such that the sub band 120*b* is in close contact with the user's head, based on at least one of pressure between the sub band 120*b* and the user's head, a distance between the sub band 120*b* and the user's head, or tension of the sub band 120*b*, sensed by the at least one sensing portion 1500.

According to an embodiment of the disclosure, the processor 1800 may adjust the length of the sub band 120*b*, based on a user input.

The sensing portion 1500 may sense, for example, and without limitation, a state of the HMD apparatus 100, a state of surroundings of the HMD apparatus 100, a state of a user wearing the HMD apparatus 100, the user's motion, or the like, and transfer the sensed information to the processor 1800.

For example, the sensing portion 1500 may sense a user's motion, and output a signal related to the user's motion to the controller 120. Herein, the signal may be an electrical signal.

The sensing portion 1500 may include, for example, and without limitation, at least one of a magnetic sensor 151, an acceleration sensor 152, a tilt sensor 153, a depth sensor 154, a gyroscope sensor 155, a position sensor (for example, global positioning system (GPS)), an atmospheric pressure sensor 157, a proximity sensor 158, an optical sensor 159, a pressure sensor 165, a tension sensor 166, or a distance sensor 167, or the like, although the disclosure is not limited thereto. The sensing portion 1500 may include a temperature sensor, an illumination sensor, an iris recognition sensor, etc.

Functions of the sensors may be intuitively inferred by one of ordinary skill in the art from the names, and accordingly, detailed descriptions thereof will be omitted.

The output unit 1101 may include various output circuitry and be used to output, for example, and without limitation, an audio signal, a video signal, a vibration signal, or the like, and may include, for example, and without limitation, the display 111, the sound output unit 112, and a vibration motor 113.

The display 111 may display information that is processed by the HMD apparatus 100.

According to an embodiment of the disclosure, the display 111 may display an image in the form of, for example, and without limitation, AR, Mixed Reality (MR), VR, or the like.

According to an embodiment of the disclosure, the HMD apparatus 100 may operate in an AR mode or a VR mode.

For example, when the HMD apparatus 100 operates in the VR mode, a user wearing the HMD apparatus 100 may want to see surrounding circumferences. In this case, the processor 1800 of the HMD apparatus 100 may control the display 111 to display a surrounding image captured by the camera 161 in the format of a Picture in Picture (PIP) on an area, based on a user input (for example, a voice command, a user's hand gesture, a control by a button installed in the HMD apparatus 100, a control by a remote controller, etc.). For example, the HMD apparatus 100 may zoom in or out the area on which the surrounding image captured by the camera 161 is displayed, based on a user input (for example, a voice command, a user's hand gesture, a control by a button installed in the HMD apparatus 100, a control by a remote controller, etc.).

Also, for example, the HMD apparatus 100 may perform conversion to the AR mode, based on a user input. When the HMD apparatus 100 is converted to the AR mode, the user wearing the HMD apparatus 100 may see surrounding circumferences through the window 150 and the display 111 converted to be transparent.

According to an embodiment of the disclosure, the displays 720 and 730 of FIG. 7 may be an embodiment of the display 111 of FIG. 15.

Meanwhile, when the display 111 and a touch pad may be configured as a touch screen of a layered structure, the display 111 may be used as an input device, as well as an output device. The display 111 may include, for example, and without limitation, at least one of a liquid crystal display (LCD), a thin film transistor-liquid crystal display (TFT-LCD), an organic light-emitting diode (OLED) display, a flexible display, a 3Dimensional (3D) display, an electrophoretic display, or the like. According to an implementation type of the HMD apparatus 100, the HMD apparatus 100 may include two displays 111 or more.

The sound output unit 112 may include various sound output circuitry and output audio data received from the communicator 1400 or stored in the memory 1700. Also, the sound output unit 112 may output sound signals related to functions (for example, call signal receiving sound, message receiving sound, and notification sound) that are performed by the HMD apparatus 100. The sound output unit 112 may include, for example, and without limitation, a speaker, a buzzer, or the like.

The vibration motor 113 may output a vibration signal. For example, the vibration motor 113 may output a vibration signal corresponding to an output of audio data or video data (for example, a call signal receiving sound, a message receiving sound, etc.). Also, when a touch input is made on the touch screen, the vibration motor 113 may output a vibration signal.

The user input unit 1200 may include various input circuitry and receive a user input. The user input may include a user's command or request instructing the HMD apparatus 100 to start or terminate a predetermined operation.

The user input unit 1200 may be a device for enabling a user to input data for controlling the HMD apparatus 100. For example, the user input unit 1200 may include, for example, and without limitation, a key pad, a dome switch, a touch pad (a contact capacitive type, a pressure resistive type, an infrared sensing type, a surface acoustic wave type, an integral strain gauge type, a piezo effect type, etc.), a jog wheel, a jog switch, or the like, although the disclosure is not limited thereto.

According to an embodiment of the disclosure, the user input unit 1200 may include, for example, and without limitation, a touch panel for receiving a touch input. The touch input may be a gesture made on the touch panel by a user to control the HMD apparatus 100. For example, the touch input may include tap, touch & hold, double tap, drag, panning, flick, and drag & drop.

According to an embodiment of the disclosure, the user input unit 1200 may receive a multiple input. In this disclosure, the multiple input may refer, for example, to a combination of at least two inputs or more. For example, the HMD apparatus 100 may receive a user's touch input and a user's motion input, or a user's touch input and a user's voice input, but the disclosure is not limited thereto.

Also, the HMD apparatus 100 may receive a user's touch input and a user's eyeball input. The user's eyeball input means a user's input of adjusting the eye's blink, the stare position, the eyeball's moving speed, or the like, in order to control the HMD apparatus 100.

Meanwhile, according to an embodiment of the disclosure, the HMD apparatus 100 may further include a microphone 162. The microphone 162 may receive a user's voice, surrounding sound around the HMD apparatus 100, etc.

The communicator 1400 may include various communication circuitry and include one or more components for enabling communications between the HMD apparatus 100 and another device (not shown) or a server (not shown). For example, and without limitation, the communicator 1400 may include a short-range wireless communicator (e.g., including short-range wireless communication circuitry) 141, a mobile communicator (e.g., including mobile communication circuitry) 142, broadcast receiver (e.g., including broadcast receiving circuitry) 143, or the like.

The short-range wireless communicator 141 may include a Bluetooth communicator, a Bluetooth Low Energy (BLE) communicator, a Near Field Communication (NFC) unit, a Wireless Local Area Network (WLAN) communicator, a Zigbee communicator, an Infrared Data Association (IrDA) communicator, a Wi-Fi Direct (WFD) communicator, a ultra wideband (UWB) communicator, an Ant+ communicator, etc., although the disclosure is not limited thereto.

The mobile communicator 142 may receive/transmit wireless signals from/to at least one of a base station, an external terminal, or a server through a mobile communication network. The wireless signals may include voice call signals, video call signals, or various formats of data according to transmission/reception of text/multimedia messages.

The broadcast receiver 143 may receive broadcasting signals and/or broadcasting-related information from the outside through a broadcasting channel. The broadcasting channel may include a satellite channel and a terrestrial channel. According to an implementation example, the HMD apparatus 100 may include no broadcasting receiver 143.

The A/V input unit 1600 may include various A/V input circuitry and be provided to receive an audio signal or a video signal, and may include, for example, and without limitation, the camera (image sensor) 161 and the microphone 162. The camera (image sensor) 161 may acquire an image frame of a still image or a moving image in a video call mode or a photographing mode. An image captured through the camera (image sensor) 161 may be processed through the processor 1800 or a separate image processor (not shown).

The image captured through the camera (image sensor) 161 may be displayed on the display 111. Also, an image frame processed by the camera (image sensor) 161 may be stored in the memory 1700 or transmitted to the outside through the communicator 1400. Two or more cameras (image sensors) 161 may be provided according to a configuration aspect of the HMD apparatus 100.

The microphone 162 may receive a sound signal from the outside and process the sound signal to electrical voice data. For example, the microphone 162 may receive a sound signal from an external device or a speaker. The microphone 162 may use various noise removal algorithms to remove noise generated when an external sound signal is received.

The memory 1700 may, for example, store programs for processing and controlling of the processor 1800, and may store input/output data.

The memory 1700 may include, for example, and without limitation, at least one type of storage medium among a flash memory type, a hard disk type, a multimedia card micro type, card type memory (for example, SD memory or XD memory, etc.), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, a magnetic disk, or an optical disk. The HMD apparatus 100 may operate web storage or a cloud server that performs a storage function of the memory 1700 on the Internet.

Programs stored in the memory 1700 may be classified into a plurality of modules including various executable program elements according to the functions. For example, the programs may include, for example, and without limitation, a UI module 171, a notification module 172, a Speak to Text (STT) module 173, and an image processing module 174.

The UI module 171 may provide specialized UI, GUI, etc. that interwork with the HMD apparatus 100 according to applications.

The notification module 172 may output a notification signal in the form of a video signal through the display 111, a notification signal in the form of an audio signal through the sound output device 112, or a notification signal in the form of a vibration signal through the vibration motor 113.

The STT module 173 may convert voice included in multimedia content to text to thus create a transcript corresponding to the multimedia content.

The image processing module 174 may process video data. The image processing module 174 may perform various image processing on video data, such as decoding, scaling, noise filtering, frame rate conversion, resolution conversion, etc.

FIGS. 14 and 15 are diagrams illustrating an example embodiment of the disclosure, and the disclosure is not limited to the embodiment of FIGS. 14 and 15.

Figure 16:
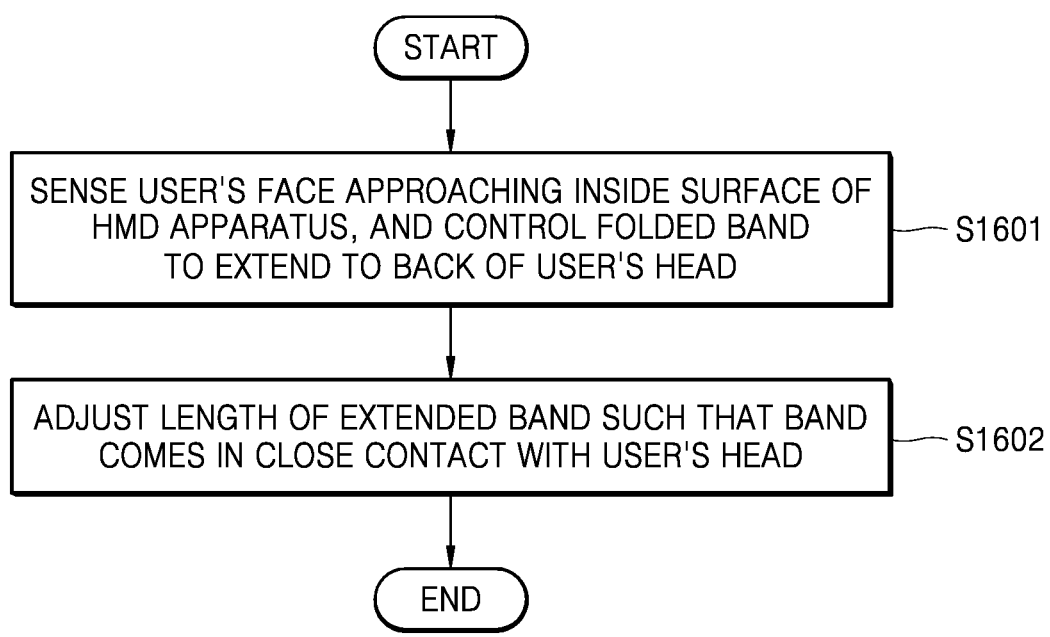
FIG. 16 is a flowchart illustrating an example method of operating an HMD apparatus according to an embodiment.
Figure 17A:
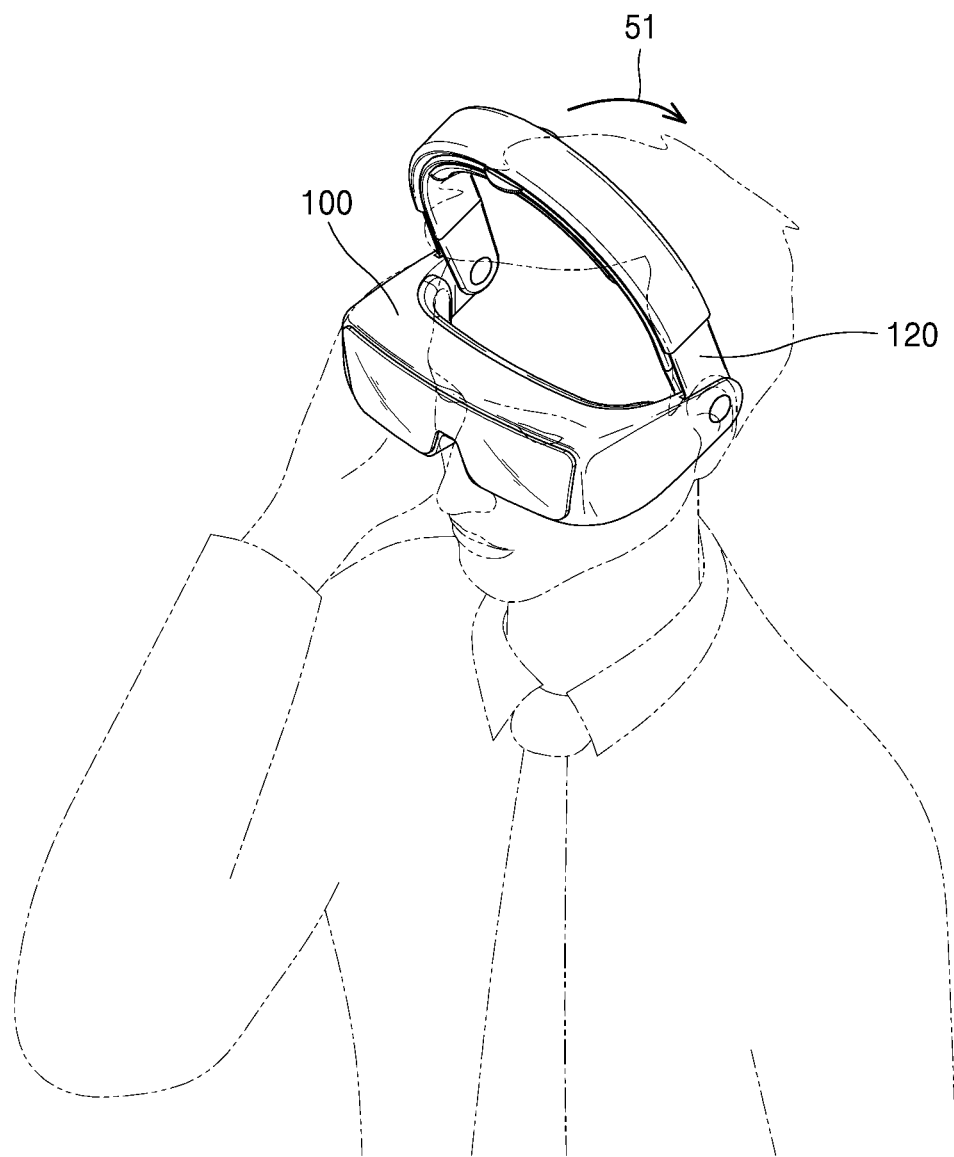
FIGS. 17A and 17B are diagrams illustrating example methods of operating an HMD apparatus according to an embodiment.
Figure 17B:
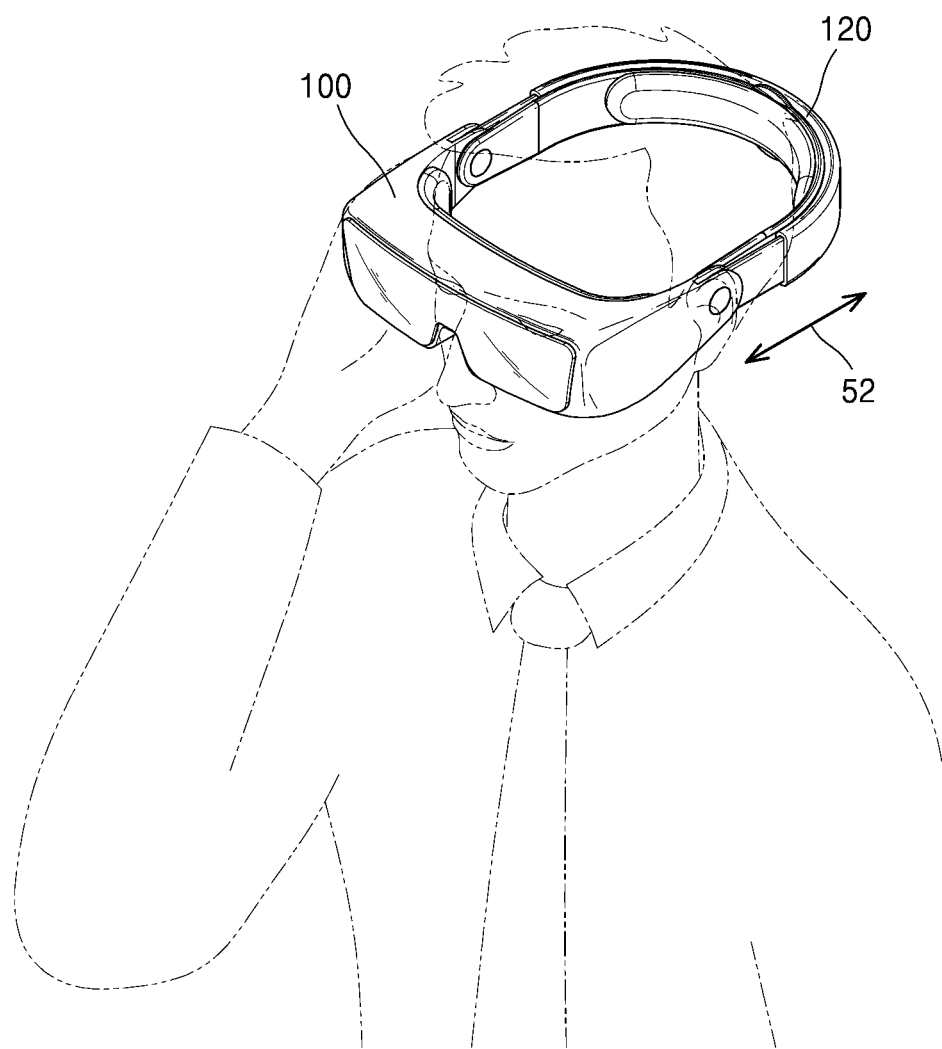

FIG. 16 is a flowchart illustrating an example operating method of a HMD apparatus according to an embodiment of the disclosure. FIGS. 17A and 17B are diagrams illustrating an example operating method of an example HMD apparatus according to an embodiment of the disclosure. The flowchart of FIG. 16 will be described with reference to FIGS. 17A and 17B.

In operation S1601, the HMD apparatus 100 according to an embodiment of the disclosure may sense a user's face approaching the inside surface of the HMD apparatus 100, and control the folded band 120 to extend toward the back of the user's head.

According to an embodiment of the disclosure, the HMD apparatus 100 may sense a user's face approaching the inside surface of the HMD apparatus 100 using the sensing portion 1500 (see FIG. 15).

According to an embodiment of the disclosure, the HMD apparatus 100 may sense that a user brings the inside surface of the HMD apparatus 100 close to his/her face using at least one sensing portion 1500 (for example, a distance sensor, a temperature sensor, a pressure sensor, an illumination sensor, a proximity sensor, an iris recognition sensor, and an atmospheric pressure sensor) included in the HMD apparatus 100.

For example, when a sensing value of a temperature sensor or a distance sensor installed in an area where a user's face or nose may contact when the user wears the HMD apparatus 100 reaches a predetermined threshold value, the HMD apparatus 100 may determine that the user brings the inside surface of the HMD apparatus 100 close to his/her face in order to wear the HMD apparatus 100.

For example, when the HMD apparatus 100 recognizes the user's iris using an iris recognition sensor, the HMD apparatus 100 may determine that the user brings the inside surface of the HMD apparatus 100 close to his/her face.

For example, when an inclination value measured by an inclination sensor changes continuously, the HMD apparatus 100 may determine that the user brings the inside surface of the HMD apparatus 100 close to his/her face, although the disclosure is not limited thereto.

According to an embodiment of the disclosure, the HMD apparatus 100 may combine information measured by a plurality of sensors to accurately determine that the inside surface of the HMD apparatus 100 approaches a user's face.

In operation S1601, according to an embodiment of the disclosure, when the processor 1800 of the HMD apparatus 100 determines that the inside surface of the HMD apparatus 100 approaches the user's face, the processor 1800 of the HMD apparatus 100 may control the band 120 folded to the top of the user's head to extend toward the back of the user's head.

According to an embodiment of the disclosure, before the user wears the HMD apparatus 100, or when the HMD apparatus 100 is in a turned-off state, the band 120 of the HMD apparatus 100 may be in a folded state (see FIG. 1).

As illustrated in FIG. 17A, for example, when the user brings the inside surface of the HMD apparatus 100 close to his/her face while holding the HMD apparatus 100 with his/her one hand, the band 120 folded to the top of the user's head may extend automatically toward the back of the user's head (in a direction indicated by an arrow 51).

In operation S1602, the HMD apparatus 100 according to an embodiment of the disclosure may adjust the length of the extended band 120 such that the band 120 is in close contact with the user's head.

The processor 1800 of the HMD apparatus 100 according to an embodiment of the disclosure may adjust the length of the band 120, based on at least one of pressure between the band 120 and the user's head, a distance between the band 120 and the user's head, and/or tension of the band 120, sensed by the at least one sensing portion 1500.

As illustrated in FIG. 17B, the length of the band 120 extended to the back of the user' head may be adjusted (in a direction indicated by an arrow 52) to be in close contact with the user's head.

For example, the processor 1800 may reduce or extend the length of the band 120 such that tension of the band 120 sensed by the tension sensor 166 (see FIG. 15) reaches a predetermined threshold value.

For example, the processor 1800 may reduce or extend the length of the band 120 such that pressure of the band 120 sensed by the pressure sensor 165 (see FIG. 15) reaches a predetermined threshold value, although the disclosure is not limited thereto.

According to an embodiment of the disclosure, the HMD apparatus 100 may more accurately determine whether the band 120 is in close contact with the user's head, by combining information measured by a plurality of sensors.

According to an embodiment of the disclosure, a threshold value for a sensing value, such as pressure between the band 120 and the user's head, a distance between the band 120 and the user's head, tension of the band 120, etc., may have been set in advance by the HMD apparatus 100.

According to an embodiment of the disclosure, a threshold value for a sensing value may have been set when the HMD apparatus 100 was manufactured, or may be set or changed according to a user input.

For example, the HMD apparatus 100 may store predetermined threshold values for pressure, a distance, tension, etc. at which a user wearing the HMD apparatus 100 can feel secure.

The HMD apparatus 100 may set a threshold value according to a user input. For example, the HMD apparatus 100 may receive a user input of selecting a length of the band 120 at which a user feels comfortable and secure, according to a user input for adjusting the length of the band 120 when the user wears the HMD apparatus 100.

According to an embodiment of the disclosure, the HMD apparatus 100 may set a threshold value in correspondence to user identification information. For example, because the HMD apparatus 100 may be used by a plurality of users, the HMD apparatus 100 may store a threshold value suitable for a specific user A in correspondence to identification information of the user A. Accordingly, when the user A wears the HMD apparatus 100, the user A may input his/her identification information to the HMD apparatus 100, and accordingly, the length of the band 120 may be automatically adjusted to a length suitable for the user A.

According to an embodiment of the disclosure, the HMD apparatus 100 may adjust the length of the band 120 based on a user input.

For example, there may be a case in which after the HMD apparatus 100 adjusts the length of the band 120 such that the band 120 is in close contact with the head of a user wearing the HMD apparatus 100, the user needs to again adjust the length of the band 120 in order to feel more comfortable.

According to an embodiment of the disclosure, a user input for adjusting the length of the band 120 may be an input through a button included in the HMD apparatus 100, a user's voice input, or a gesture input, although the disclosure is not limited thereto.

According to an embodiment of the disclosure, the HMD apparatus 100 may receive a user's voice input through the microphone 162.

According to an embodiment of the disclosure, the HMD apparatus 100 may recognize a user's gesture in a 3D space by using a depth sensor 154. For example, the depth sensor 154 may measure a depth value of an input tool (for example, a hand, a finger, an electronic pen, etc.).

According to an embodiment of the disclosure, by supporting the inside surface of the HMD apparatus 100 on the user's face and adjusting the length of the band 120 extended to the back of the user's head such that the band 120 is in close contact with the user's head, the HMD apparatus 100 may be stably worn on the user's head. According to an embodiment of the disclosure, the user may easily wear the HMD apparatus 100 on his/her head by raising the HMD apparatus 100 in a direction in which the user's both eyes faces the inside surface of the HMD apparatus 100 to cause the HMD apparatus 100 to be in contact with the user's face, while holding the HMD apparatus 100 with his/her one hand.

FIGS. 16, 17A and 17B are diagrams illustrating an example embodiment of the disclosure, and the disclosure is not limited to the embodiment of FIGS. 16, 17A and 17B.

Figure 18:
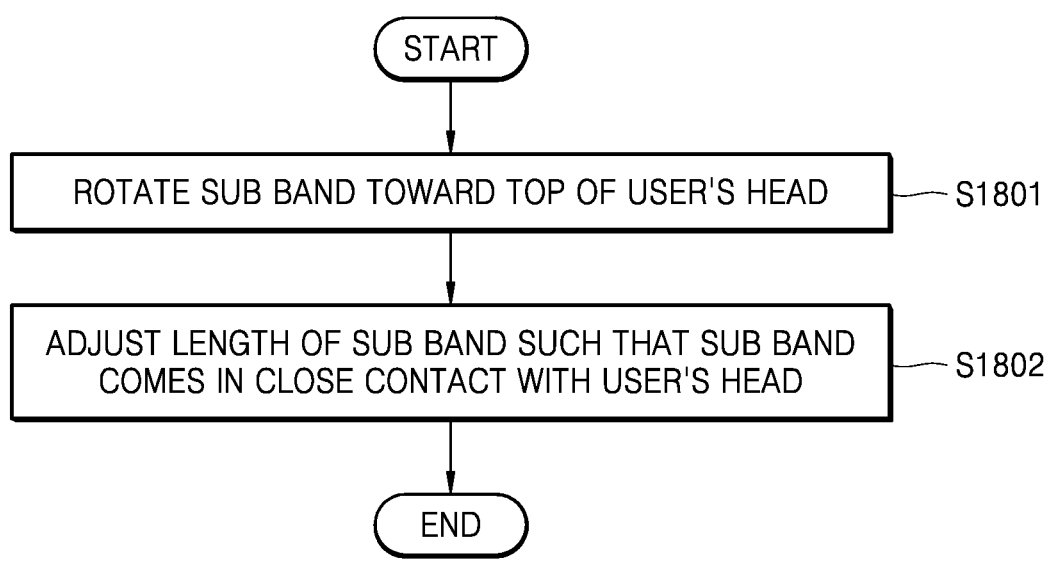
FIG. 18 is a flowchart illustrating an example method of operating a sub band of an example HMD apparatus according to an embodiment.
Figure 19A:
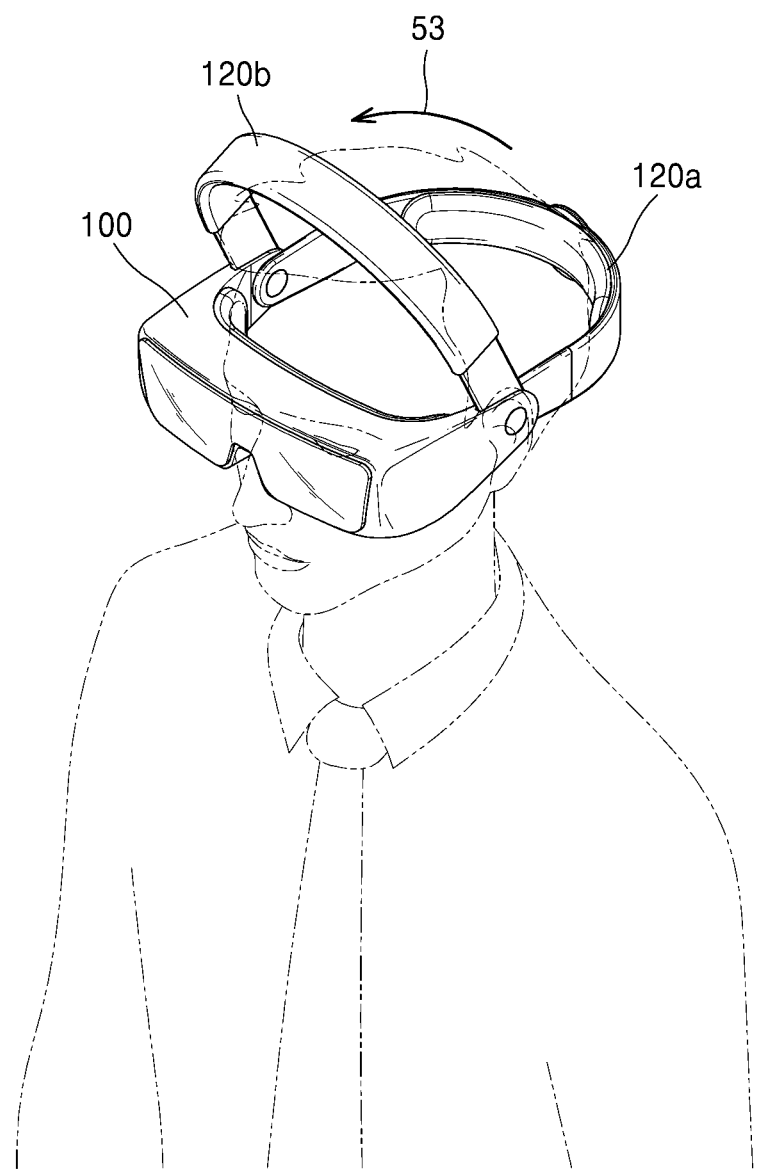
FIGS. 19A and 19B are diagrams illustrating example methods of operating a sub band of an example HMD apparatus according to an embodiment.
Figure 19B:
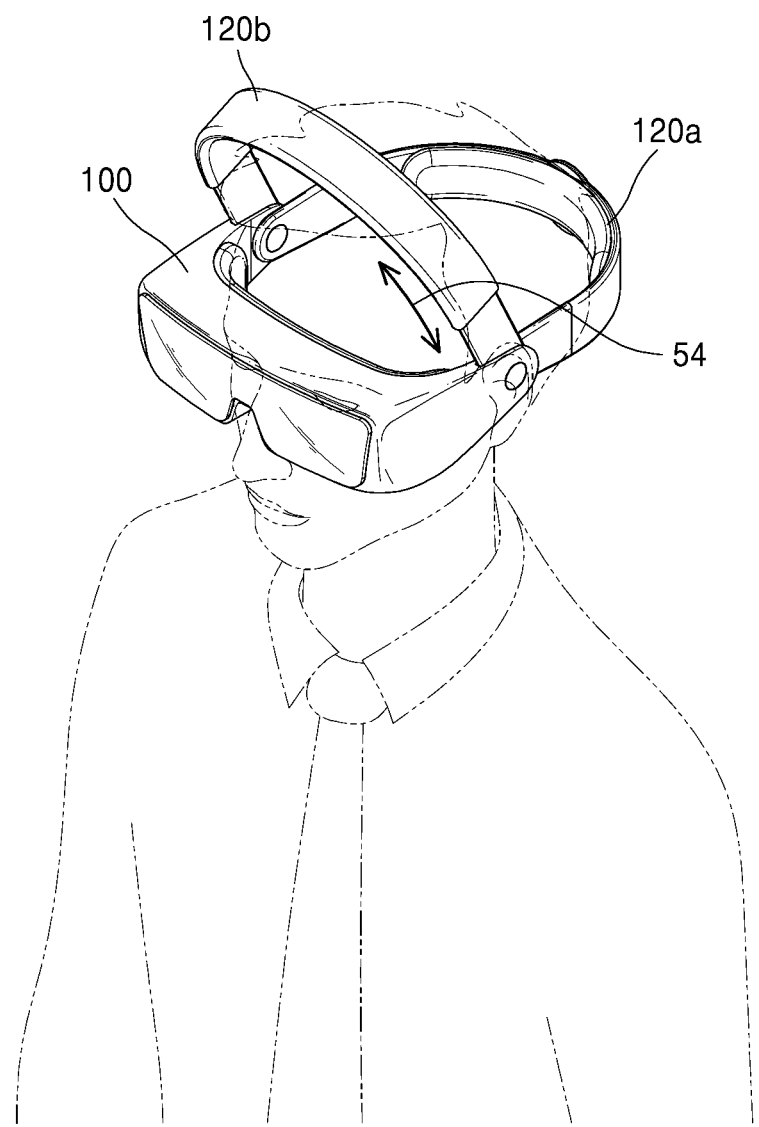

FIG. 18 is a flowchart illustrating an example method of operating an HMD apparatus according to an embodiment of the disclosure. FIGS. 19A and 19B are diagrams illustrating an example method of a sub band of a HMD apparatus according to an embodiment of the disclosure. Hereinafter, the flowchart of FIG. 18 will be described with reference to FIGS. 19A and 19B.

In operation S1801, the HMD apparatus 100 according to an embodiment of the disclosure may rotate the sub band 120b toward the top of a user's head.

According to an embodiment of the disclosure, the band 120 may include the main band 120a and the sub band 120b disposed on the outer side of the main band 120a (see FIG. 4). The sub band 120b may be rotatable independently from the main band 120b.

As illustrated in FIG. 19A, the sub band 120b among the bands 120a and 120b extending to the back of the head of a user wearing the HMD apparatus 100 may rotate independently to move to the top of the user's head (in a direction indicated by an arrow 53), in the state in which the main band 120a is fixed at the back of the user's head.

According to an embodiment of the disclosure, the processor 1800 of the HMD apparatus 100 may rotate the sub band 120b toward the top of the user's head based on a predetermined condition.

According to an embodiment of the disclosure, when a movement exceeding a predetermined threshold value is sensed in the HMD apparatus 100 by the at least one sensing portion 1500, the processor 1800 may rotate the sub band 120b to the top of the user's head.

For example, when the user wearing the HMD apparatus 100 moves, the HMD apparatus 100 may shake on the user's head. At this time, the sub band 120b may rotate automatically to the top of the user's head to become in close contact with the top of the user's head. Because the main band 120a supports the back of the user's head and the sub band 120b supports the top of the user's head, it may be possible to provide the user wearing the HMD apparatus with a more stable wearing sensation.

According to an embodiment of the disclosure, the processor 1800 of the HMD apparatus 100 may rotate the sub band 120b to the top of the user's head, based on a user input.

According to an embodiment of the disclosure, the HMD apparatus 100 may maintain the main band 120a to support the back of the user's head and rotate the sub band 120b to support the top of the user's head, according to an input from the user wearing the HMD apparatus 100.

According to an embodiment of the disclosure, a user input for rotating the sub band 120b may be an input through a button included in the HMD apparatus 100, a user's voice input, or a gesture input, although the disclosure is not limited thereto.

According to an embodiment of the disclosure, the sub band 120b may rotate to support the top of the user's head according to a user input, so that the user wearing the HMD apparatus 100 may feel a more stable wearing sensation.

In operation S1802, the HMD apparatus 100 according to an embodiment of the disclosure may adjust the length of the sub band 120b such that the sub band 120b is in close contact with the user's head.

According to an embodiment of the disclosure, the processor 1800 of the HMD apparatus 100 may adjust the length of the sub band 120b such that the sub band 120b is in close contact with the user's head, based on at least one of pressure between the sub band 120b and the user's head, a distance between the sub band 120b and the user's head, or tension of the sub band 120b, sensed by the at least one sensing portion 1500.

As illustrated in FIG. 19B, the length of the sub band 120b rotated to the top of the user's head may be adjusted (in a direction indicated by an arrow 54) such that the sub band 120b is in close contact with the top of the user's head.

For example, the processor 1800 may reduce or extend the length of the sub band 120b such that tension of the sub band 120b sensed by the tension sensor 166 (see FIG. 15) reaches a predetermined threshold value.

For example, the processor 1800 may reduce or extend the length of the sub band 120b such that pressure sensed by the pressure sensor 165 (see FIG. 15) reaches a predetermined threshold value, although the disclosure is not limited thereto.

According to an embodiment of the disclosure, the HMD apparatus 100 may more accurately determine whether the sub band 120b of the HMD apparatus 100 is in close contact with the top of the user's head, by combining information measured by a plurality of sensors.

According to an embodiment of the disclosure, a threshold value for a sensing value, such as pressure between the sub band 120b rotated to the top of the user's head and the user's head, a distance between the sub band 120b and the user's head, tension of the sub band 120b, etc., may have been set in advance by the HMD apparatus 100.

According to an embodiment of the disclosure, a threshold value for a sensing value may have been set when the HMD apparatus 100 was manufactured, or may be set or changed according to a user input.

For example, the HMD apparatus 100 may store predetermined threshold values for sensing values of pressure, a distance, tension, etc. of the sub band 120b rotated to the top of the user's head, at which a user wearing the HMD apparatus 100 can feel secure.

The HMD apparatus 100 may set a threshold value according to a user input. For example, the HMD apparatus 100 may set a threshold value by receiving a user input of selecting a length of the sub band 120b at which a user feels comfortable and secure, according to a user input for adjusting the length of the sub band 120b rotated to the top of the user's head when the user wears the HMD apparatus 100.

According to an embodiment of the disclosure, the HMD apparatus 100 may set threshold values for sensing values of pressure, a distance, tension, etc. of the sub band 120b for adjusting the length of the sub band 120b, in correspondence to user identification information.

According to an embodiment of the disclosure, the HMD apparatus 100 may adjust the length of the sub band 120b, based on a user input including at least one of an input through a button included in the HMD apparatus 100, a user's voice input, and/or a gesture input.

Various operations for adjusting the length of the band 120 described above in operation S1602 of FIG. 16 may be applied as operation S1802 for adjusting the length of the sub band 120b. According to an embodiment of the disclosure, the sub band 120b of the HMD apparatus 100 may be in close contact with the top of the user's head so that the HMD apparatus 100 can be worn more stably on the user's head.

FIGS. 18, 19A and 19B are diagrams illustrating an example embodiment of the disclosure, and the disclosure is not limited to the embodiment of FIGS. 18, 19A and 19B.

When the HMD apparatus according to an embodiment of the disclosure is worn on a user, the band can operate automatically by the sensor. Accordingly, the user can wear or take off the HMD apparatus with his/her one hand. Operations for wearing and taking off the HMD apparatus according to an embodiment of the disclosure are convenient compared to operations for wearing and taking off typical HMD apparatuses. Also, when users wear and take off the typical HMD apparatuses, their hair used to get tangled. However, because operations of wearing and taking the HMD apparatus according to an embodiment of the disclosure are simple and convenient, such inconvenience can be resolved.

The aforementioned embodiments of the disclosure are examples, and are not intended for limiting the disclosure. Also, the order of operations shown in the flowcharts is not limited, and according to various embodiments of the disclosure, some of the operations may be omitted or another operation may be added. Also, some of the operations may be performed in a different order.

The aforementioned embodiments of the disclosure may be written as programs that can be executed on computers, and may be implemented in general-use computers that execute the programs using a computer readable medium. In addition, a data structure used in the embodiments of the disclosure may be recorded on the computer readable medium via various devices. Also, the aforementioned embodiments of the disclosure may be embodied in the form of a recording medium including instructions executable by a computer, such as a program module that is executed by a computer. For example, methods implemented by software modules or algorithms may be stored in computer readable recording media as codes or program commands that may be read and executed by the computer.

The computer readable medium may be any recording medium that may be accessed by a computer and may include volatile and non-volatile media and removable and non-removable media. The computer readable medium may include magnetic storage media, such as ROM, floppy disks, and hard disks, and optical storage media, such as CD ROMs and DVDs, although the disclosure is not limited thereto. The computer readable medium may also include computer storage media and communication media.

In addition, a plurality of computer readable recording media may be distributed over computer systems connected via a network, and data, such as program instructions and codes, stored in the distributed recording media may be executed by at least one computer.

Specific executions described in the disclosure are merely example embodiments of the disclosure and should not be understood as limiting the scope of the disclosure. For the conciseness of the disclosure, existing electronic components, control systems, software, and other functional aspects of the systems may be omitted.

The aforementioned description about the disclosure is provided for the purpose of illustration, and it would be understood by those of skill in the art that various changes and modifications can be made without changing the technical concept and essential features of the disclosure. Thus, it is clear that the above-described example embodiments of the disclosure are illustrative in all aspects and do not limit the disclosure. For example, each component described to be of a single type may be implemented in a distributed manner. Likewise, components described to be distributed may be implemented in a combined manner.

Throughout the disclosure, the use of all examples or example terms, such as "for example" and "etc." is to describe the disclosure in detail and the scope of the disclosure is not limited by these examples or example terms unless specifically limited by the following claims.

Also, the components described in the disclosure may not be essential components unless the components are clearly described with the terms "essential", "important", and the like.

It will be understood by those of skill in the art that various changes in form and details may be made therein without departing from the spirit and scope of the disclosure.

The scope of the disclosure is defined by the following claims rather than by the detailed description of the disclosure. It should be understood that all modifications and embodiments of the disclosure conceived from the meaning and scope of the claims and their equivalents are included in the scope of the disclosure.

The terms "unit", "module", and the like used herein refer to a unit used to process at least one function or operation and may be implemented by software, hardware, or any combination thereof.

The "unit" and "module" may be stored in in an addressable storage medium and may be implemented by a program that can be executed by a processor.

For example, the "unit" and "module" may be implemented by components, such as software components, object-oriented software components, class components and task components, processes, functions, attributes, procedures, subroutines, segments of program code, drivers, firmware, microcode, circuitry, data, databases, data structures, tables, arrays, and variables.

Throughout the disclosure, the phrase "A may include one of a1, a2 and a3" indicates that exemplary elements that may be included in the component A are a1, a2 or a3 in a broad sense.

Here, the elements that may include the component A is not necessarily limited to a1, a2, or a3. It should be noted, therefore, that the elements that may include the component A are not intended to preclude another element not illustrated in addition to a1, a2, and a3.

What is claimed is:

1. A head mounted display (HMD) apparatus, the HMD apparatus comprising:
    a band;
    at least one sensor; and
    a processor configured to control the HMD apparatus to, based on a user's face approaching an inside surface of the HMD apparatus being sensed by the at least one sensor, rotate the band from a folded state to an unfolded state extending towards the back of the user's head, and to adjust a length of the band in the unfolded state such that the band in the unfolded state comes in contact with the user's head.

2. The HMD apparatus of claim 1, wherein the processor is further configured to control the HMD apparatus to adjust the length of the band based on at least one of: pressure between the band and the user's head, a distance between the band and the user's head, and a tension of the band, the pressure, the distance, and the tension being sensed by the at least one sensor.

3. The HMD apparatus of claim 1, wherein the processor is further configured to control the HMD apparatus to adjust the length of the band based on a sensing value, the sensing value being set in advance and corresponding to user identification information.

4. The HMD apparatus of claim 1, wherein the processor is further configured to control the HMD apparatus to adjust the length of the band based on a user input.

5. The HMD apparatus of claim 4, further comprising a button,
    wherein the user input includes at least one of: an input through the button, a voice input, and a gesture input.

6. The HMD apparatus of claim 1, wherein the band comprises a main band and a sub band disposed on an outer side of the main band,
    wherein the sub band is rotatable independently from the main band, and
    the processor is further configured to control the HMD apparatus to rotate the sub band from a position corresponding to the extended position of the main band toward the top of the user's head based on a predetermined condition.

7. The HMD apparatus of claim 6, wherein the processor is further configured to control the HMD apparatus to rotate the sub band toward the top of the user's head based on a movement exceeding a predetermined threshold value being sensed by the at least one sensor.

8. The HMD apparatus of claim 6, wherein the processor is further configured to control the HMD apparatus rotate the sub band toward the top of the user's head based on a user input.

9. The HMD apparatus of claim 6, wherein the processor is further configured to control the HMD apparatus to adjust the length of the sub band such that the sub band comes in contact with the user's head, based on at least one of: pressure between the sub band and the user's head, a distance between the sub band and the user's head, and tension of the band, the pressure, the distance, and the tension being sensed by the at least one sensor.

10. The HMD apparatus of claim 6, wherein the processor is further configured to control the HMD to adjust the length of the sub band based on a user input.

11. The HMD apparatus of claim 10, further comprising a button,
    wherein the user input includes at least one of: an input through the button, a voice input, and a gesture input.

12. A method of operating a HMD apparatus, the HMD apparatus including a band, the method comprising:
    controlling, based on a user's face approaching an inside surface of the HMD apparatus being sensed by at least one sensor, the band to rotate from a folded state to an unfolded state extending towards the back of the user's head; and
    adjusting a length of the band in the unfolded state such that the band in the unfolded state comes in contact with the user's head.

13. The method of claim 12, wherein the adjusting of the length of the band comprises adjusting the length of the band based on at least one of: pressure between the band and the user's head, a distance between the band and the user's head, and tension of the band, the pressure, the distance, and the tension being sensed by the at least one sensor.

14. The method of claim 12, wherein the adjusting of the length of the band comprises adjusting the length of the band based on a sensing value, the sensing value being set in advance and corresponding to user identification information.

15. The method of claim 12, further comprising adjusting the length of the band based on a user input.

16. The method of claim 12, wherein the band comprises a main band and a sub band disposed on an outer side of the main band, and
    wherein the sub band is rotatable independently from the main band,
    the method further comprising rotating the sub band toward the top of the user's head based on a predetermined condition.

17. The method of claim 16, wherein the rotating of the sub band comprises rotating the sub band toward the top of the user's head based on a movement exceeding a predetermined threshold value being sensed by the at least one sensor.

18. The method of claim 16, wherein the rotating of the sub band comprises rotating the sub band toward the top of the user's head based on a user input.

19. The method of claim 16, further comprising adjusting the length of the sub band such that the sub band comes in contact with the user's head based on at least one of: pressure between the sub band and the user's head, a distance between the sub band and the user's head, and tension of the sub band, the pressure, the distance, and the tension being sensed by the at least one sensor.

20. A head mounted display (HMD) apparatus, the HMD apparatus comprising:
    a band;
    at least one sensor; and
    a processor configured to:
        identify that the HMD apparatus is being worn based on information from the at least one sensor;
        based on the identifying that the HMD apparatus is being worn, rotate the band from a folded state to an unfolded state extending towards the back of a user's head; and adjust a length of the band in the unfolded state such that the band in the unfolded state comes in contact with the user's head.

* * * * *